United States Patent
Kawamura et al.

(10) Patent No.: US 12,043,224 B2
(45) Date of Patent: Jul. 23, 2024

(54) VEHICLE CLEANER SYSTEM, VEHICLE SYSTEM, CLEANING METHOD PERFORMED BY VEHICLE CLEANER SYSTEM, AND VEHICLE CLEANER CONTROL DEVICE

(71) Applicant: KOITO MANUFACTURING CO., LTD., Tokyo (JP)

(72) Inventors: Kazuki Kawamura, Shizuoka (JP); Akinobu Kubota, Shizuoka (JP); Masaru Sakai, Shizuoka (JP); Masaaki Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 561 days.

(21) Appl. No.: 16/978,449

(22) PCT Filed: Mar. 6, 2019

(86) PCT No.: PCT/JP2019/008841
§ 371 (c)(1),
(2) Date: Sep. 4, 2020

(87) PCT Pub. No.: WO2019/172306
PCT Pub. Date: Sep. 12, 2019

(65) Prior Publication Data
US 2021/0362688 A1 Nov. 25, 2021

(30) Foreign Application Priority Data

Mar. 7, 2018 (JP) .................................. 2018-041034
Mar. 7, 2018 (JP) .................................. 2018-041035
(Continued)

(51) Int. Cl.
*B60S 1/60* (2006.01)
*B60S 1/52* (2006.01)
*B60S 1/54* (2006.01)

(52) U.S. Cl.
CPC ............... *B60S 1/603* (2013.01); *B60S 1/526* (2013.01); *B60S 1/54* (2013.01)

(58) Field of Classification Search
None
See application file for complete search history.

(56) References Cited

U.S. PATENT DOCUMENTS 4,768,716 A * 9/1988 Buchanan, Jr. ........... B05B 9/06
239/284.1
6,158,671 A * 12/2000 Kodaira ................... B62J 6/022
239/284.2
(Continued)

FOREIGN PATENT DOCUMENTS

CN 101439706 A 5/2009
CN 106394444 A 2/2017
(Continued)

OTHER PUBLICATIONS

International Search Report dated May 14, 2019 (PCT/ISA/210) issued by the International Searching Authority for International Application No. PCT/JP2019/008841.
(Continued)

*Primary Examiner* — Spencer E. Bell
*Assistant Examiner* — Omair Chaudhri
(74) *Attorney, Agent, or Firm* — Sughrue Mion, PLLC

(57) ABSTRACT

A vehicle cleaner system includes: a cleaner unit configured to be mounted on a vehicle and to discharge a cleaning liquid to an external sensor that acquires information outside the vehicle so as to clean the external sensor; and a cleaner control unit configured to control the cleaner unit. The
(Continued)

cleaner control unit is configured to acquire vehicle speed information related to a traveling speed of the vehicle, and control the cleaner unit such that at least one of a discharge amount of the cleaning liquid, a discharge amount of the cleaning liquid per unit time, the number of times of discharge of the cleaning liquid, the number of times of discharge of the cleaning liquid per unit time, and a discharge time of the cleaning liquid varies according to the vehicle speed information.

15 Claims, 18 Drawing Sheets

(30) Foreign Application Priority Data

Mar. 19, 2018 (JP) .................................. 2018-051329
Mar. 19, 2018 (JP) .................................. 2018-051339

(56) References Cited

U.S. PATENT DOCUMENTS

| | | | |
|---|---|---|---|
| 6,236,180 B1* | 5/2001 | Contos | B60S 1/485 318/482 |
| 9,783,166 B1* | 10/2017 | Brown | B60S 1/481 |
| 2005/0274398 A1* | 12/2005 | Fonville | B60S 1/522 134/42 |
| 2010/0230991 A1* | 9/2010 | Fioravanti | B60S 1/481 296/96.15 |
| 2013/0092758 A1* | 4/2013 | Tanaka | B60S 1/52 239/284.1 |
| 2014/0104426 A1* | 4/2014 | Boegel | B60R 1/10 348/148 |
| 2015/0030462 A1* | 1/2015 | Boekenkamp | B60S 1/485 417/14 |
| 2015/0032292 A1* | 1/2015 | Stratton | B60S 1/0848 701/2 |
| 2015/0329083 A1* | 11/2015 | Kiyohara | B60S 1/485 348/148 |
| 2016/0347287 A1* | 12/2016 | Tousignant | B60S 1/486 |
| 2017/0036647 A1 | 2/2017 | Zhao et al. | |
| 2018/0272996 A1* | 9/2018 | Nielsen | B60S 1/52 |
| 2018/0361997 A1* | 12/2018 | Schmidt | G02B 27/00 |
| 2018/0362085 A1* | 12/2018 | Shichino | G02B 27/0006 |
| 2019/0009752 A1* | 1/2019 | Rice | B60S 1/56 |
| 2019/0039575 A1* | 2/2019 | Hansen | G02B 27/0006 |
| 2019/0106085 A1* | 4/2019 | Bacchus | G02B 27/0006 |
| 2019/0106086 A1* | 4/2019 | Giraud | B60S 1/0848 |
| 2019/0241158 A1* | 8/2019 | Ghannam | G05D 1/0238 |
| 2019/0322245 A1* | 10/2019 | Kline | B60S 1/0848 |
| 2020/0139936 A1* | 5/2020 | Yamauchi | B60S 1/36 |
| 2020/0156594 A1 | 5/2020 | Zhao et al. | |
| 2020/0391702 A1* | 12/2020 | Yamauchi | B60Q 9/00 |
| 2021/0197769 A1* | 7/2021 | Shirakura | B60S 1/56 |

FOREIGN PATENT DOCUMENTS

| | | | | |
|---|---|---|---|---|
| CN | 106573581 A | | 4/2017 | |
| DE | 102012224480 A1 | * | 7/2014 | ............ B60S 1/485 |
| DE | 102015000468 A1 | * | 7/2016 | ............ B60S 1/485 |
| JP | 9-169257 A | | 6/1997 | |
| JP | 2000-142328 A | | 5/2000 | |
| JP | 2001-171491 A | | 6/2001 | |
| JP | 2014-37239 A | | 2/2014 | |
| JP | 2014-201150 A | | 10/2014 | |
| JP | 2014-227002 A | | 12/2014 | |
| JP | 2015-214199 A | | 12/2015 | |
| JP | 2016-9099 A | | 1/2016 | |
| JP | 2016009099 A | * | 1/2016 | ............... B60S 1/60 |
| JP | 2016-187990 A | | 11/2016 | |
| KR | 20080053543 A | * | 6/2008 | |
| WO | WO-2019049381 A1 | * | 3/2019 | ............... B60S 1/04 |
| WO | WO-2019124014 A1 | * | 6/2019 | ............... B60S 1/60 |

OTHER PUBLICATIONS

Written Opinion dated May 14, 2019 (PCT/ISA/237) issued by the International Searching Authority for International Application No. PCT/JP2019/008841.

Office Action dated Mar. 23, 2023, issued by Chinese Patent Office for Chinese Application No. 201980017255.X.

Office Action issued Apr. 11, 2023, issued by the Japan Patent Office in counterpart Japanese Patent Application No. 2020-505074.

* cited by examiner

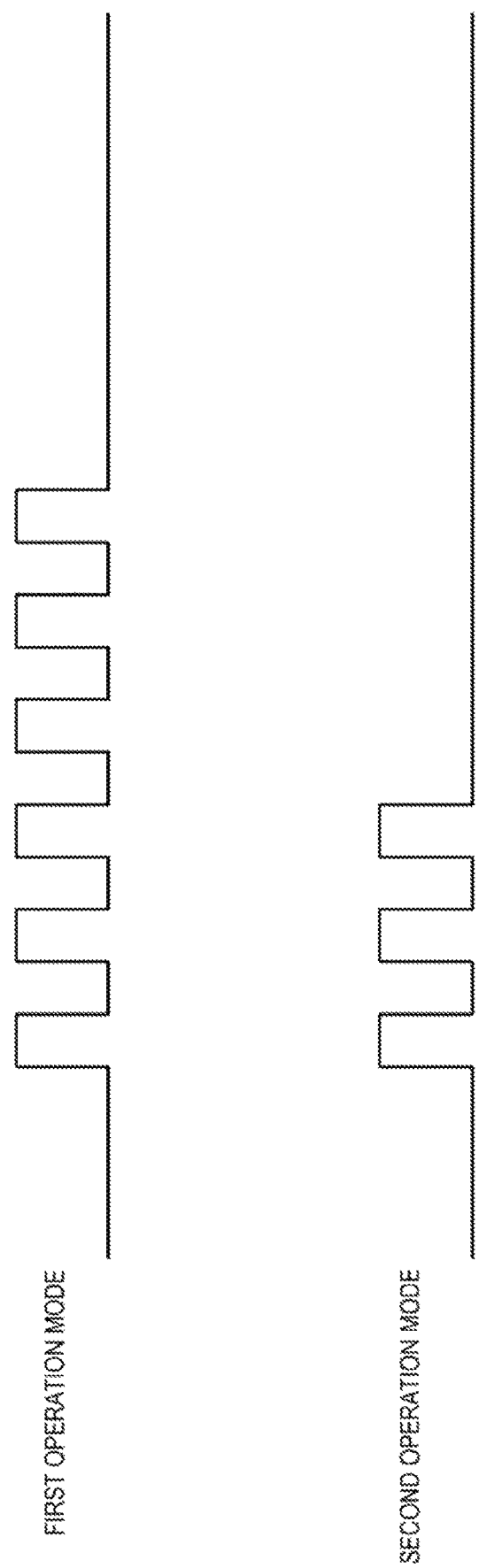

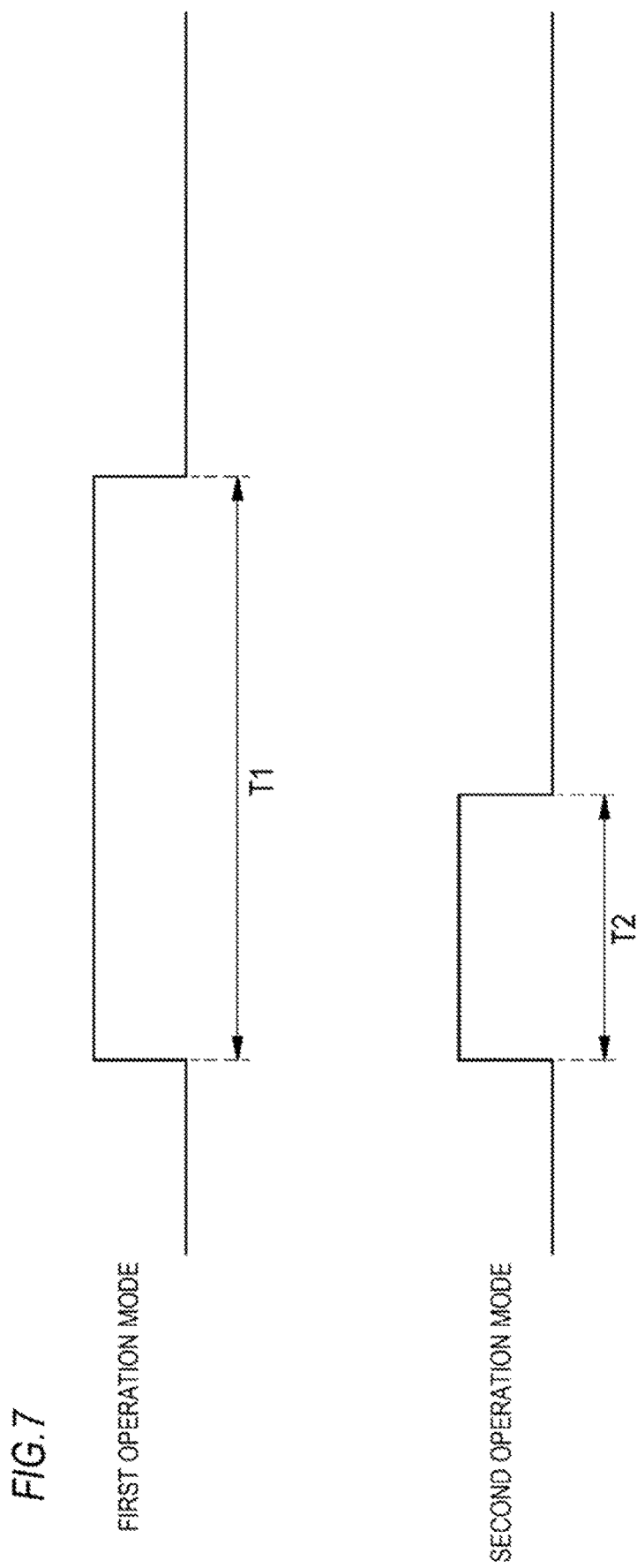

VEHICLE CLEANER SYSTEM, VEHICLE SYSTEM, CLEANING METHOD PERFORMED BY VEHICLE CLEANER SYSTEM, AND VEHICLE CLEANER CONTROL DEVICE

CROSS-REFERENCE TO RELATED APPLICATIONS

This application is a National Phase Entry of PCT International Application No. PCT/JP2019/008841, filed on Mar. 6, 2019, which claims priority to Japanese Patent Application No. 2018-041034 filed on Mar. 7, 2018, Japanese Patent Application No. 2018-041035 filed on Mar. 7, 2018, Japanese Patent Application No. 2018-051329 filed on Mar. 19, 2018, Japanese Patent Application No. 2018-051339 filed on Mar. 19, 2018, the contents on all of which are incorporated herein by reference in their entirety.)

TECHNICAL FIELD

The present disclosure relates to a vehicle cleaner system, a vehicle system, a cleaning method performed by a vehicle cleaner system, and a vehicle cleaner control device.

BACKGROUND ART

A vehicle cleaner that discharges a cleaning liquid to a sensor or the like mounted on a vehicle is known in Patent Literature 1 and the like.

CITATION LIST

Patent Literature

Patent Literature 1: JP2016-187990A

SUMMARY OF INVENTION

Problem to be Solved

In a case where a vehicle travels on a highway or the like, a traveling speed of the vehicle is larger than that in a case where the vehicle travels on a general road. Therefore, in the case where the vehicle travels on the expressway, the sensor is required to more accurately and quickly sense an object that is farther away from the vehicle as compared with the case where the vehicle travels on the general road. That is, in the case where the traveling speed of the vehicle is larger, sensitivity of the sensor is required to be high. Further, in a situation where the vehicle approaches a traffic congestion location, the sensitivity of the sensor is required to be high.

In an automatic driving vehicle capable of executing a manual driving mode and the automatic driving mode, it is required to clean an external sensor that acquires information on the outside of the vehicle when executing the automatic driving mode. On the other hand, there is a limit to an amount of a cleaning medium that can be mounted on the vehicle, and it is also required to suppress the wear of the cleaner.

In addition, when an obstacle is on a road, sensitivity of a sensor that detects external information is required to be increased so as to avoid contact with the obstacle.

An object of the present disclosure is to provide a vehicle cleaner system and a vehicle system capable of selecting a cleaning condition suitable for cleaning an external sensor with a cleaner unit based on a traveling speed of a vehicle.

Another object of the present disclosure is to provide a vehicle cleaner system and a vehicle system that can suppress wear of a cleaner unit and consumption of a cleaning medium for keeping an external sensor in a clean state.

Another object of the present disclosure is to provide a vehicle cleaner system capable of maintaining sensitivity of a sensor by selecting whether a cleaner unit can operate according to a traveling state of a vehicle.

Another object of the present disclosure is to provide a vehicle cleaner system, a cleaning method performed by a vehicle cleaner system, and a vehicle cleaner control device that are capable of preventing a decrease in sensitivity when an obstacle is present.

Means for Solving the Problem

A vehicle cleaner system according to one aspect of the present disclosure includes:
 a cleaner unit configured to be mounted on a vehicle and to discharge a cleaning liquid to an external sensor that acquires information outside the vehicle so as to clean the external sensor; and
 a cleaner control unit configured to control the cleaner unit,
 in which the cleaner control unit is configured to
  acquire vehicle speed information related to a traveling speed of the vehicle, and
  control the cleaner unit such that at least one of a discharge amount of the cleaning liquid, a discharge amount of the cleaning liquid per unit time, the number of times of discharge of the cleaning liquid, the number of times of discharge of the cleaning liquid per unit time, and a discharge time of the cleaning liquid varies according to the vehicle speed information.

A vehicle system according to one aspect of the present disclosure includes:
 a vehicle control unit;
 a cleaner unit configured to be mounted on a vehicle and to discharge a cleaning liquid to an external sensor that acquires information outside the vehicle so as to clean the external sensor; and
 a cleaner control unit configured to control the cleaner unit,
 in which the cleaner control unit is configured to
  acquire vehicle speed information related to a traveling speed of the vehicle, and
  control the cleaner unit such that at least one of a discharge amount of the cleaning liquid, a discharge amount of the cleaning liquid per unit time, the number of times of discharge of the cleaning liquid, the number of times of discharge of the cleaning liquid per unit time, and a discharge time of the cleaning liquid varies according to the vehicle speed information.

A vehicle cleaner system according to one aspect of the present disclosure includes:
 a first cleaner unit configured to be mounted on a vehicle and to discharge a cleaning liquid to a first sensor that acquires information of a first region around the vehicle so as to clean the first sensor;
 a second cleaner unit configured to be mounted on the vehicle and to discharge a cleaning liquid to a second sensor that acquires information of a second region around the vehicle that is different from the first region so as to clean the second sensor; and a cleaner control unit configured to control the first cleaner unit and the second cleaner unit, in which the cleaner control unit is configured to
acquire vehicle speed information related to a traveling speed of the vehicle, and
permit operation of the first cleaner unit and prohibit operation of the second cleaner unit when the traveling speed is equal to or larger than a predetermined value.

A vehicle system according to one aspect of the present disclosure includes:

a vehicle control unit;
a first cleaner unit configured to be mounted on a vehicle and to discharge a cleaning liquid to a first sensor that acquires information of a first region around the vehicle so as to clean the first sensor;
a second cleaner unit configured to be mounted on the vehicle and to discharge a cleaning liquid to a second sensor that acquires information of a second region around the vehicle that is different from the first region so as to clean the second sensor; and
a cleaner control unit configured to control the first cleaner unit and the second cleaner unit,
in which the cleaner control unit is configured to
acquire vehicle speed information related to a traveling speed of the vehicle, and
permit operation of the first cleaner unit and prohibit operation of the second cleaner unit when the traveling speed is equal to or larger than a predetermined value.

A vehicle cleaner system according to one aspect of the present disclosure includes:

a cleaner unit configured to be mounted on a vehicle and to discharge a cleaning liquid to an external sensor that acquires information outside the vehicle so as to clean the external sensor; and
a cleaner control unit configured to control the cleaner unit,
in which the cleaner control unit is configured to
acquire vehicle speed information related to a traveling speed of the vehicle, and
permit operation of the cleaner unit when the traveling speed is equal to or smaller than a predetermined value, and prohibit operation of the cleaner unit when the traveling speed is larger than the predetermined value.

A vehicle cleaner system according to one aspect of the present disclosure includes:

a cleaner configured to clean an external sensor that acquires information outside a vehicle; and
a cleaner control unit configured to control an operation of the cleaner,
in which the cleaner control unit includes:
an automatic mode execution unit configured to execute an automatic mode for automatically causing the cleaner to operate based on a predetermined condition, and
an operation prohibition unit configured to prohibit operation of the cleaner based on vehicle speed information related to a traveling speed of the vehicle and obstacle information.

A cleaning method performed by a vehicle cleaner system according to one aspect of the present disclosure is:

a cleaning method performed by a vehicle cleaner system including a cleaner that cleans an external sensor that acquires information outside a vehicle and a cleaner control unit that controls operation of the cleaner, the cleaning method including:
during execution of an automatic mode for automatically causing the cleaner to operate based on a predetermined condition, prohibiting operation of the cleaner based on a traveling speed of the vehicle and obstacle information.

A vehicle cleaner control device according to one aspect of the present disclosure is:

a vehicle cleaner control device configured to control operation of a cleaner that cleans an external sensor that acquires information outside a vehicle, the vehicle cleaner control device including:
an automatic mode execution unit configured to execute an automatic mode for automatically causing the cleaner to operate based on a predetermined condition; and
an operation prohibition unit configured to prohibit operation of the cleaner based on vehicle speed information related to a traveling speed of the vehicle and obstacle information.

Effects

According to one aspect of the present disclosure, it is possible to provide a vehicle cleaner system and a vehicle system capable of selecting a cleaning condition suitable for cleaning an external sensor with a cleaner unit based on a traveling speed of a vehicle.

According to one aspect of the present disclosure, it is possible to provide a vehicle cleaner system and a vehicle system capable of selecting a cleaning condition suitable for cleaning a sensor with a vehicle cleaner based on a traveling speed of a vehicle.

According to one aspect of the present disclosure, it is possible to provide a vehicle cleaner system capable of maintaining sensitivity of a sensor by selecting whether a cleaner unit can operate according to a traveling state of a vehicle.

According to one aspect of the present disclosure, it is possible to provide a vehicle cleaner system, a cleaning method performed by a vehicle cleaner system, and a vehicle cleaner control device that are capable of preventing a decrease in sensitivity when an obstacle is present.

BRIEF DESCRIPTION OF THE DRAWINGS

FIG. 6 is a view showing a cleaning method in a first operation mode and a second operation mode of a cleaner unit executed by the vehicle cleaner system according to the first embodiment.

FIG. 7 is a view showing a cleaning method in the first operation mode and the second operation mode of the cleaner unit executed by a vehicle cleaner system according to Modification 1.

DETAILED DESCRIPTION OF EMBODIMENTS

Figure 1:
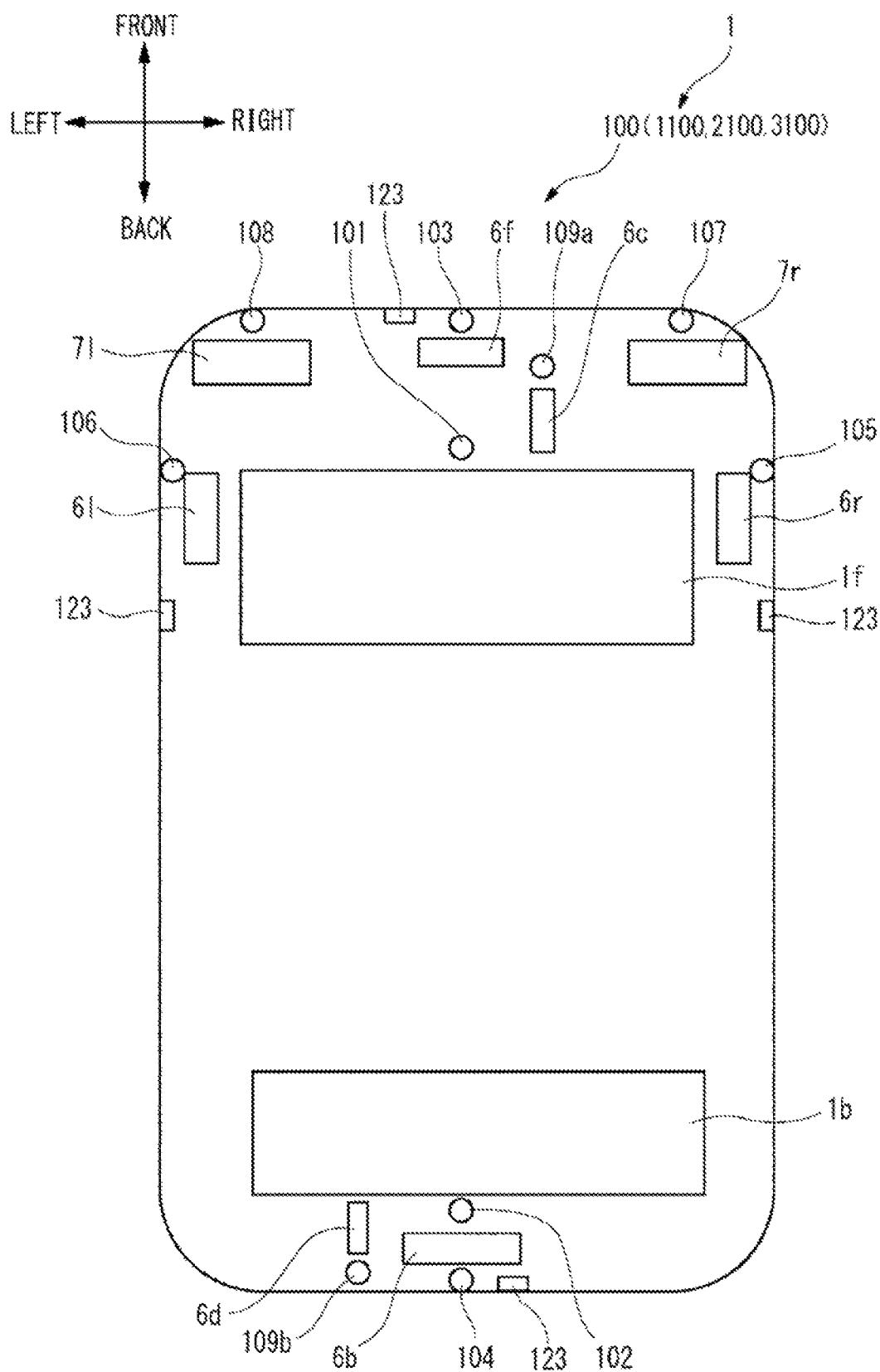
FIG. 1 is a top view of a vehicle equipped with a vehicle cleaner system according to the present disclosure.

Hereinafter, embodiments of the present disclosure will be described with reference to the drawings. Incidentally, members having the same reference numbers as members that have been described in the description of the present embodiment will be omitted for convenience of description. In addition, dimensions of members shown in the drawings may be different from actual dimensions thereof for convenience of description.

In the description of the present embodiment, "left-right direction", "front-rear direction", and "upper-lower direction" are appropriately referred to, for convenience of description. These directions are relative directions set for a vehicle 1 shown in FIG. 1.

Here, the "upper-lower direction" is a direction including an "upper direction" and a "lower direction". The "front-rear direction" is a direction including a "front direction" and a "rear direction". The "left-right direction" is a direction including a "left direction" and a "right direction". In addition, portions common in the first to the fourth embodiments will be simply referred to as the present embodiment.

FIG. 1 is a top view of the vehicle 1 in which a vehicle cleaner system 100 (hereinafter, referred to as a cleaner system 100) according to the present embodiment is mounted. The vehicle 1 includes the cleaner system 100. In the present embodiment, the vehicle 1 is an automobile that can travel in an automatic driving mode.

Figure 2:
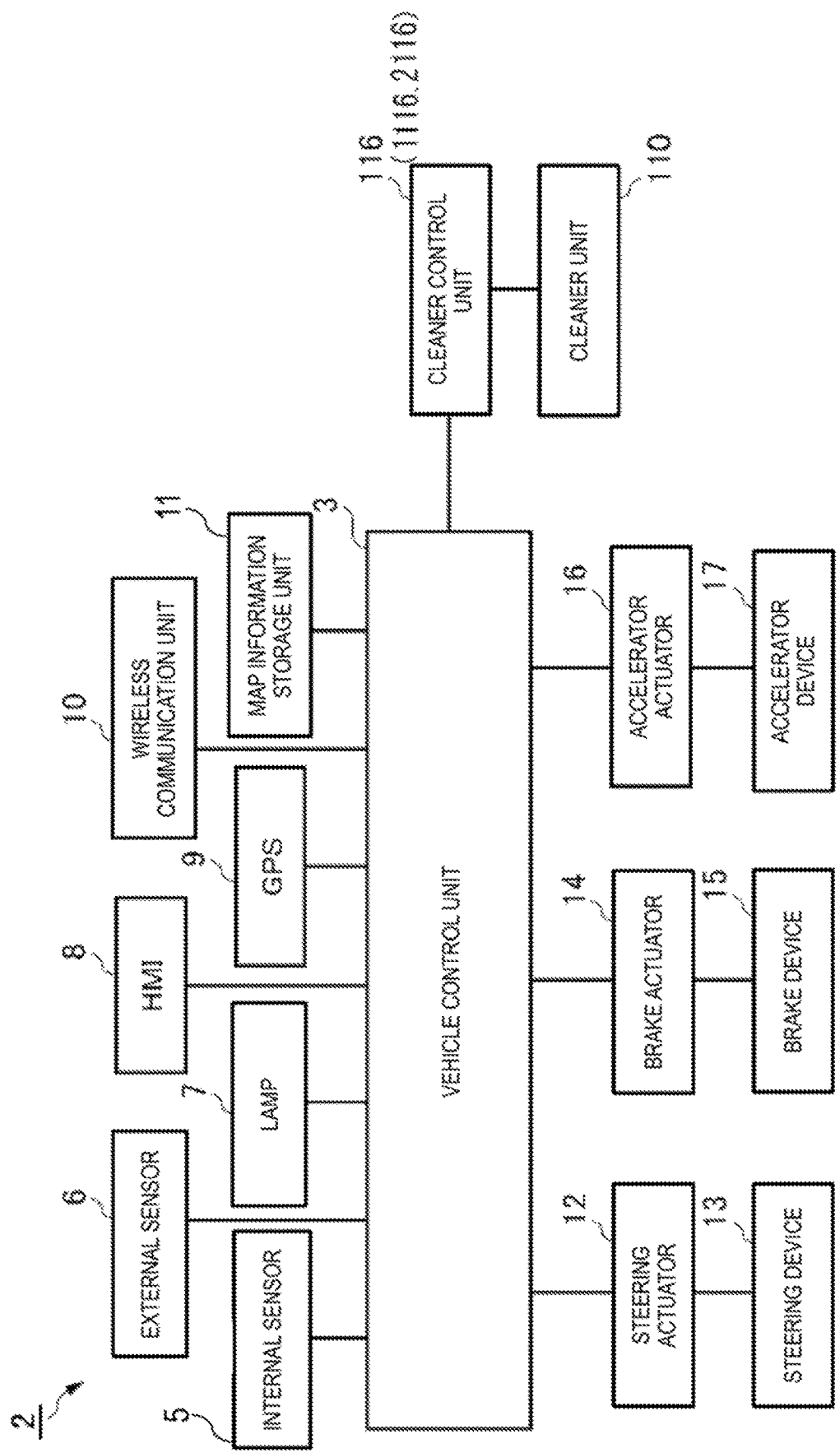
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 includes an electronic control unit (ECU). The vehicle control unit 3 includes a processor such as a central processing unit (CPU), a read only memory (ROM) in which various vehicle control programs are stored, and a random access memory (RAM) in which various vehicle control data is temporarily stored. The processor is configured to load a program designated from the various vehicle control programs stored in the ROM onto the RAM and execute various processes in cooperation with the RAM. The vehicle control unit 3 is configured to control traveling of the vehicle 1.

The lamp 7 is at least one of a headlamp or a position lamp provided at a front portion of the vehicle 1, a rear combination lamp provided at a rear portion of the vehicle 1, a turn signal lamp provided on the front portion or a side portion of the vehicle, various lamps for notifying a pedestrian and a driver of other vehicles of a status of a host vehicle, or the like.

The HMI 8 includes an input unit that receives an input operation from a user, and an output unit that outputs traveling information or the like to the user. The input unit includes a steering wheel, an accelerator pedal, a brake pedal, a driving mode switching switch that switches a driving mode of the vehicle 1, or the like. The output unit is a display that displays various traveling information.

The internal sensor 5 is a sensor capable of acquiring information of the host vehicle. The internal sensor 5 is, for example, at least one of an acceleration sensor, a vehicle speed sensor, a wheel speed sensor, and a gyro sensor. The internal sensor 5 is configured to acquire information of the host vehicle including a traveling state of the vehicle 1 and output the information to the vehicle control unit 3.

The internal sensor 5 may include a sensor that detects a displacement of the HMI 8, a seating sensor that detects whether the user is sitting on a seat, a face orientation sensor that detects a direction of a face of the user, a human detection sensor that detects whether there is a person in the vehicle, or the like. The internal sensor 5 may include a position information sensor (e.g., GPS).

The external sensor 6 is a sensor capable of acquiring information on outside of the host vehicle. The external sensor 6 is, for example, at least one of a camera, a radar, a LiDAR, the GPS 9, the wireless communication unit 10, or the like. The external sensor 6 is configured to acquire information on the outside of the host vehicle including a surrounding environment of the vehicle 1 (another vehicle, a pedestrian, a road shape, a traffic sign, an obstacle, or the like) and output the information to the vehicle control unit 3. Alternatively, the external sensor 6 may include a weather sensor that detects a weather condition, an illuminance sensor that detects an illuminance of the surrounding environment of the vehicle 1, or the like.

The camera is, for example, a camera including an image pickup element such as a charge-coupled device (CCD) or a complementary MOS (CMOS). The camera is a camera that detects visible light or an infrared camera that detects infrared rays.

The radar is, for example, a millimeter-wave radar, a microwave radar, or a laser radar.

The LiDAR is an abbreviation for light detection and ranging or laser imaging detection and ranging. The LiDAR is generally a sensor that emits non-visible light forward and acquires information such as a distance to an object, a shape of an object, a material of an object, and the like based on the emitted light and return light.

The GPS 9, which is a kind of the external sensor 6, is configured to acquire current position information of the vehicle 1 by measuring distances of a plurality of artificial satellites with respect to the host vehicle 1, and output the acquired current position information to the vehicle control unit 3. The wireless communication unit 10, which is a kind of the external sensor 6, is configured to receive traveling information of another vehicle around the vehicle 1 from the other vehicle and transmit the traveling information of the vehicle 1 to the other vehicle (inter-vehicle communication). In addition, the wireless communication unit 10 is configured to receive infrastructure information from infrastructure equipment such as a traffic light or a sign lamp and transmit the traveling information of the vehicle 1 to the infrastructure equipment (road-to-vehicle communication). Further, the wireless communication unit 10 is configured to, for example, use a Vehicle Information and Communication System (VICS) (registered trademark) to receive road traffic information (for example, traffic congestion or traffic regulation) in real time by using FM multiplex broadcasting or a beacon. The map information storage unit 11 is an external storage device such as a hard disk drive in which map information is stored, and is configured to output the map information to the vehicle control unit 3.

The vehicle control unit 3 is configured to receive an output of the internal sensor 5 that detects a displacement of an operator operated by a user such as the steering wheel, the accelerator pedal, and the brake pedal, an output of the internal sensor 5 that detects a state of the vehicle, such as the vehicle speed sensor, the vehicle wheel speed sensor, the acceleration sensor, and a yaw rate sensor, and an output of the external sensor 6 that acquires the information on the outside of the vehicle 1. The vehicle control unit 3 is configured to generate a steering control signal, an accelerator control signal, and a brake control signal based on these outputs, and control (process) these signals as necessary.

The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal.

The vehicle 1 can travel in the automatic driving mode and a manual driving mode. The vehicle control unit 3 can selectively execute the automatic driving mode and the manual driving mode.

In the automatic driving mode, the vehicle control unit 3 automatically generates the steering control signal, the accelerator control signal, and the brake control signal in accordance with the output of the external sensor 6 that acquires the information on the outside of the vehicle 1. The vehicle control unit 3 automatically generates the steering control signal, the accelerator control signal, and the brake control signal in accordance with the output of the external sensor 6, regardless of the output of the internal sensor 5 that detects the displacement of the operator that can be operated by the user.

For example, in the automatic driving mode, the vehicle control unit 3 automatically generates the steering control signal, the accelerator control signal, and the brake control signal based on surrounding environment information in front of the vehicle 1 acquired by a front camera 6c, the current position information of the GPS 9, the map information stored in the map information storage unit 11, or the like. In the automatic driving mode, the vehicle 1 is driven independently of the user.

In the manual driving mode, the vehicle control unit 3 normally generates the steering control signal, the accelerator control signal, and the brake control signal regardless of the output of the external sensor 6. That is, in the manual driving mode, the vehicle control unit 3 generates the steering control signal based on the operation of the steering wheel of the user, regardless of the output of the external sensor 6. The vehicle control unit 3 normally generates the accelerator control signal based on the operation of the accelerator pedal of the user, regardless of the output of the external sensor 6. The vehicle control unit 3 generates the brake control signal based on the operation of the brake pedal of the user, regardless of the output of the external sensor 6. In the manual driving mode, the vehicle 1 is normally driven by the user.

In the manual driving mode, the vehicle control unit 3 may execute an anti-lock brake control for controlling the brake control signal in accordance with the output of the vehicle wheel speed sensor, which is the internal sensor 5, for example. In the manual driving mode, the vehicle control unit 3 may execute a skid prevention control (electric stability control), a traction control, or the like, which controls at least one of the steering control signal, the accelerator control signal, and the brake control signal in accordance with the output of a steering angle sensor, the vehicle wheel speed sensor, and the yaw rate sensor that are the internal sensors 5.

Alternatively, in the manual driving mode, the vehicle control unit 3 may execute a pre-crash control and a collision avoidance control for generating the steering control signal and the brake control signal in accordance with the output of the external sensor 6 such as the front camera 6c in an emergency. In this manner, in the manual driving mode, the vehicle control unit 3 may generate at least one of the steering control signal, the accelerator control signal, and the brake control signal in accordance with the output of the external sensor 6 in an emergency.

In the manual driving mode, a trigger for generating the steering control signal, the accelerator control signal, and the brake control signal is normally a displacement of an operator such as the steering wheel, the accelerator pedal, and the brake pedal operated by the user. In the manual driving mode, the vehicle control unit 3 may normally control (process) a signal such as the steering control signal, the accelerator control signal, and the brake control signal generated by the displacement of the operator in accordance with the output of the internal sensor 5 or the external sensor 6. In the present embodiment, a so-called assist driving mode that assists the driving of the user in accordance with the output of the internal sensor 5 or the external sensor 6 is one form of the manual driving mode.

According to the definitions of levels 0 to 5 of the automatic driving mode currently known as of 2018, the automatic driving mode of the present embodiment corresponds to levels 3 to 5 (except for an emergency or the like), and the manual driving mode of the present embodiment corresponds to levels 0 to 2.

Referring back to FIG. 1, the vehicle 1 includes, as the external sensor 6, a front LiDAR 6f, a rear LiDAR 6b, a right LiDAR 6r, a left LiDAR 6l, the front camera 6c, and a rear camera 6d. The front LiDAR 6f is configured to acquire information on a front side of the vehicle 1. The rear LiDAR 6b is configured to acquire information on a rear side of the vehicle 1. The right LiDAR 6r is configured to acquire information on a right side of the vehicle 1. The left LiDAR 6l is configured to acquire information on a left side of the vehicle 1. The front camera 6c is configured to acquire information on the front side of the vehicle 1. The rear camera 6d is configured to acquire information on the rear side of the vehicle 1.

In the example shown in FIG. 1, the front LiDAR 6f is provided on a front portion of the vehicle 1, the rear LiDAR 6b is provided on a rear portion of the vehicle 1, the right LiDAR 6r is provided on a right portion of the vehicle 1, and the left LiDAR 6l is provided on a left portion of the vehicle 1, but the present invention is not limited to this example. For example, the front LiDAR, the rear LiDAR, the right LiDAR, and the left LiDAR may be collectively arranged on a ceiling portion of the vehicle 1.

The vehicle 1 includes a right headlamp 7r and a left headlamp 7l as the lamp 7. The right headlamp 7r is provided on a right portion of the front portion of the vehicle 1, and the left headlamp 7l is provided on a left portion of the front portion of the vehicle 1. The right headlamp 7r is provided on a right side of the left headlamp 7l.

The vehicle 1 includes a front window 1f and a rear window 1b.

The vehicle 1 includes the cleaner system 100 according to the present embodiment. The cleaner system 100 is a system that removes foreign matters such as a water droplet, mud, dust, or the like adhering to an object to be cleaned using a cleaning medium. In the present embodiment, the cleaner system 100 includes a front window washer (hereinafter, referred to as a front WW) 101, a rear window washer (hereinafter, referred to as a rear WW) 102, a front LiDAR cleaner (hereinafter referred to as a front LC) 103, and a rear LiDAR cleaner (hereinafter, referred to as a rear LC) 104, a right LiDAR cleaner (hereinafter referred to as a right LC) 105, a left LiDAR cleaner (hereinafter, referred to as a left LC) 106, a right headlamp cleaner (hereinafter referred to as a right HC) 107, a left headlamp cleaner (hereinafter referred to as a left HC) 108, a front camera cleaner 109a, and a rear camera cleaner 109b. Each of the cleaners 101 to 109b includes one or more nozzles, and discharges the cleaning medium such as a cleaning liquid or air from the nozzle toward the object to be cleaned. Incidentally, each of the cleaners 101 to 109b may be referred to as a cleaner unit 110.

The front WW 101 can clean the front window 1f. The rear WW 102 can clean the rear window 1b. The front LC 103 can clean the front LiDAR 6f. The rear LC 104 can clean the rear LiDAR 6b. The right LC 105 can clean the right LiDAR 6r. The left LC 106 can clean the left LiDAR 6l. The right HC 107 can clean the right headlamp 7r. The left HC 108 can clean the left headlamp 7l. The front camera cleaner 109a can clean the front camera 6c. The rear camera cleaner 109b can clean the rear camera 6d.

Figure 3:
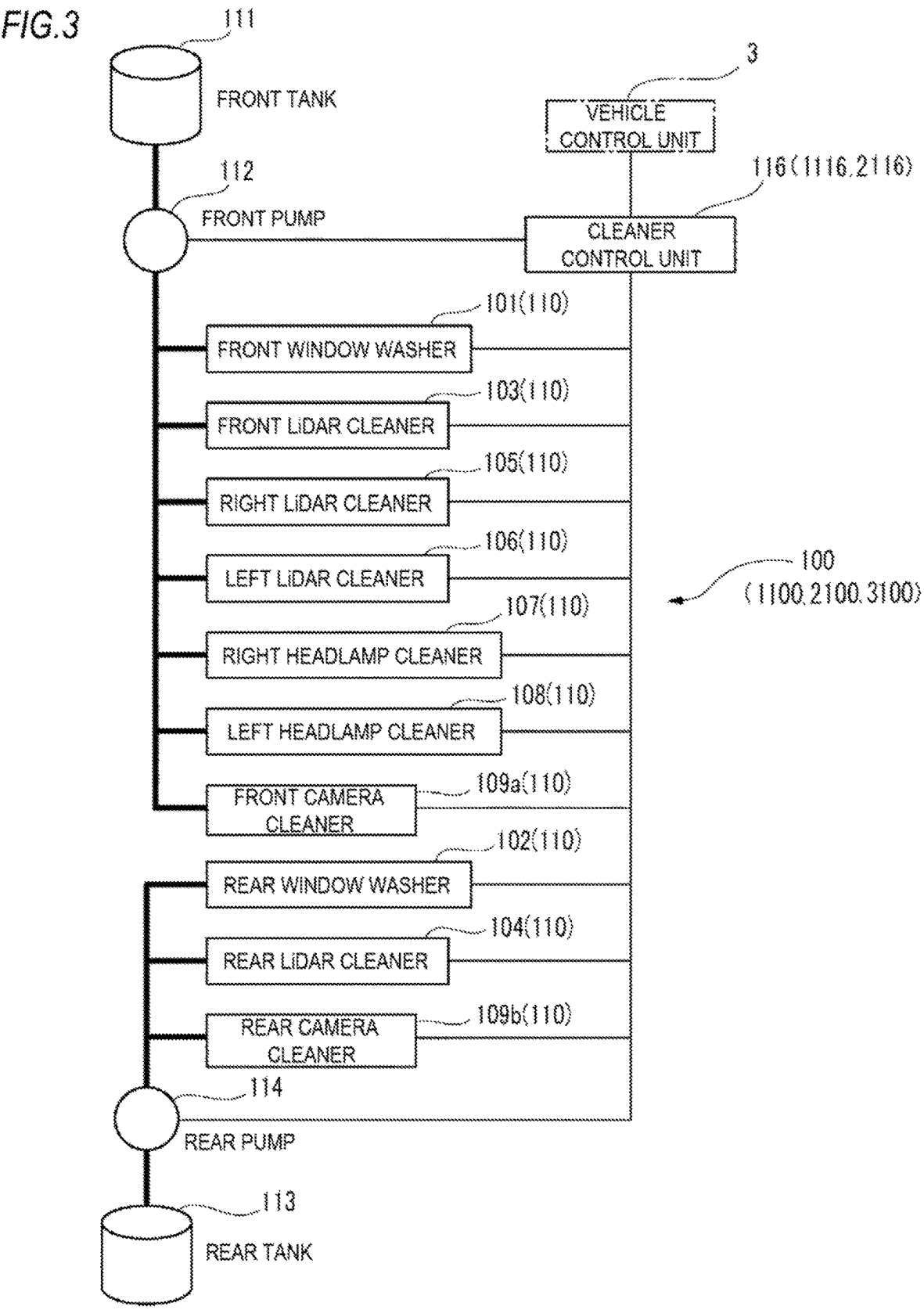
FIG. 3 is a schematic view of the vehicle cleaner system.

FIG. 3 is a schematic view of the cleaner system 100. The cleaner system 100 includes, in addition to the cleaner units 101 to 109b, a front tank 111, a front pump 112, a rear tank 113, a rear pump 114, and a cleaner control unit 116 (control unit).

The front WW 101, the front LC 103, the right LC 105, the left LC 106, the right HC 107, the left HC 108, and the front camera cleaner 109a are connected to the front tank 111 via the front pump 112. The front pump 112 sends the cleaning liquid stored in the front tank 111 to the front WW 101, the front LC 103, the right LC 105, the left LC 106, the right HC 107, the left HC 108, and the front camera cleaner 109a.

The rear WW 102, the rear LC 104, and the rear camera cleaner 109b are connected to the rear tank 113 via the rear pump 114. The rear pump 114 sends the cleaning liquid stored in the rear tank 113 to the rear WW 102, the rear LC 104, and the rear camera cleaner 109b.

Each of the cleaners 101 to 109b is provided with an actuator that opens the nozzle to discharge the cleaning liquid to the object to be cleaned. The actuator provided in each of the cleaners 101 to 109b are electrically connected to the cleaner control unit 116. In addition, the cleaner control unit 116 is also electrically connected to the front pump 112, the rear pump 114, and the vehicle control unit 3.

First Embodiment

Hereinafter, a vehicle cleaner system according to a first embodiment will be described with reference to the drawings.

Figure 4:
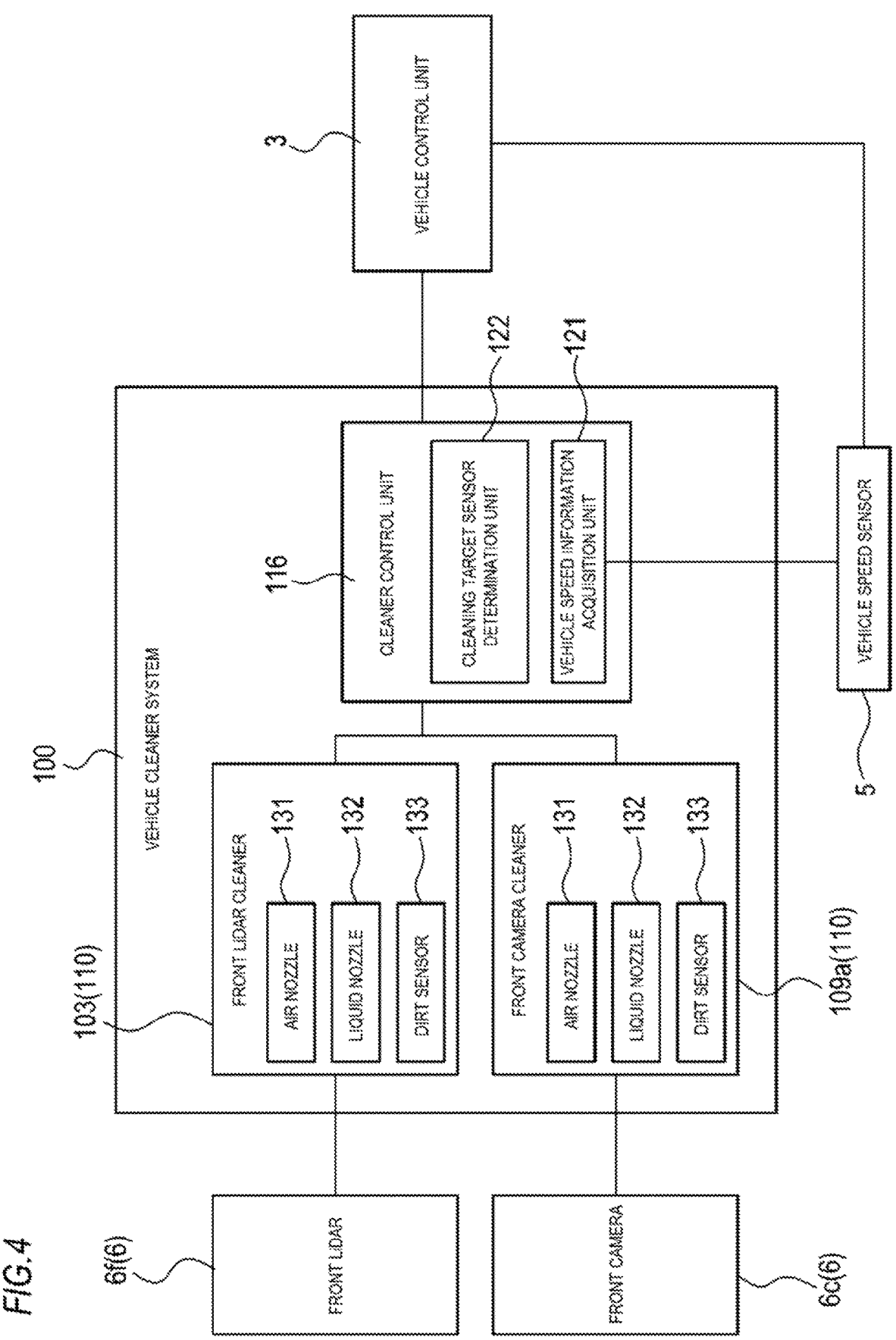
FIG. 4 is a block diagram of a main part of a vehicle cleaner system according to a first embodiment.

FIG. 4 is a block diagram of a main part of the vehicle cleaner system 100 according to the first embodiment. As shown in FIG. 4, the vehicle cleaner system 100 includes the cleaner units 110 that cleans the external sensors 6, and the cleaner control unit 116 that controls the operation of the cleaner units 110. Although only the front LC 103 and the front camera cleaner 109a are shown as the cleaner units 110 in FIG. 4, it is needless to say that the vehicle cleaner system 100 includes the other cleaner units 110 as shown in FIG. 3.

The front LC 103 and the front camera cleaner 109a each have an air nozzle 131 that discharges air (for example, high-pressure air) as a cleaning medium to the external sensor 6, a liquid nozzle 132 that discharges a cleaning liquid as a cleaning medium to the external sensor 6, and a dirt sensor 133 that detects the dirt on the external sensor 6. Specifically, the front LC 103 includes the air nozzle 131 that discharges air as the cleaning medium to the front LiDAR 6f, the liquid nozzle 132 that discharges the cleaning liquid as the cleaning medium to the front LiDAR 6f, and the dirt sensor 133 that detects the dirt on the front LiDAR 6f. Similarly, the front camera cleaner 109a and the other cleaner units 110 also include the air nozzle 131, the liquid nozzle 132, and the dirt sensor 133.

The cleaner control unit 116 is connected to the front LC 103 and the front camera cleaner 109a, respectively. The cleaner control unit 116 is configured to control each cleaner unit 110. The cleaner control unit 116 is configured with, for example, at least one electronic control unit (ECU). The electronic control unit may include at least one microcontroller including one or more processors and one or more memories, and other electronic circuits including active elements such as transistors and passive elements. The processor is, for example, a central processing unit (CPU), a micro processing unit (MPU), and/or a graphics processing unit (GPU). The CPU may be configured with a plurality of CPU cores. The GPU may be configured with a plurality of GPU cores. The memory includes a read only memory (ROM) and a random access memory (RAM). A control program for the cleaner unit 110 may be stored in the ROM.

The processor may be configured to load a program designated from a program group stored in the ROM onto the RAM and execute various processes in cooperation with the RAM. In addition, the electronic control unit (ECU) may be configured by an integrated circuit (hardware resource) such as an application specific integrated circuit (ASIC) or a field-programmable gate array (FPGA). Further, the electronic control unit may be configured by a combination of at least one microcontroller and an integrated circuit.

The cleaner control unit 116 includes a vehicle speed information acquisition unit 121 and a cleaning target sensor determination unit 122. The vehicle speed information acquisition unit 121 acquires a traveling speed of the vehicle 1 (vehicle speed). The vehicle speed information acquisition unit 121 is connected to the vehicle speed sensor 5 as the internal sensor, and acquires vehicle speed information. The cleaning target sensor determination unit 122 specifies an external sensor 6 as the cleaning target among the plurality of external sensors 6 according to the vehicle speed acquired by the vehicle speed information acquisition unit 121.

In the present embodiment, the cleaner control unit 116 receives a detection signal (for example, a dirt signal) from the dirt sensor 133, determines whether the external sensor 6 is in a clean state, and causes the cleaner unit 110 to operate when the external sensor 6 is not in the clean state.

Figure 5:
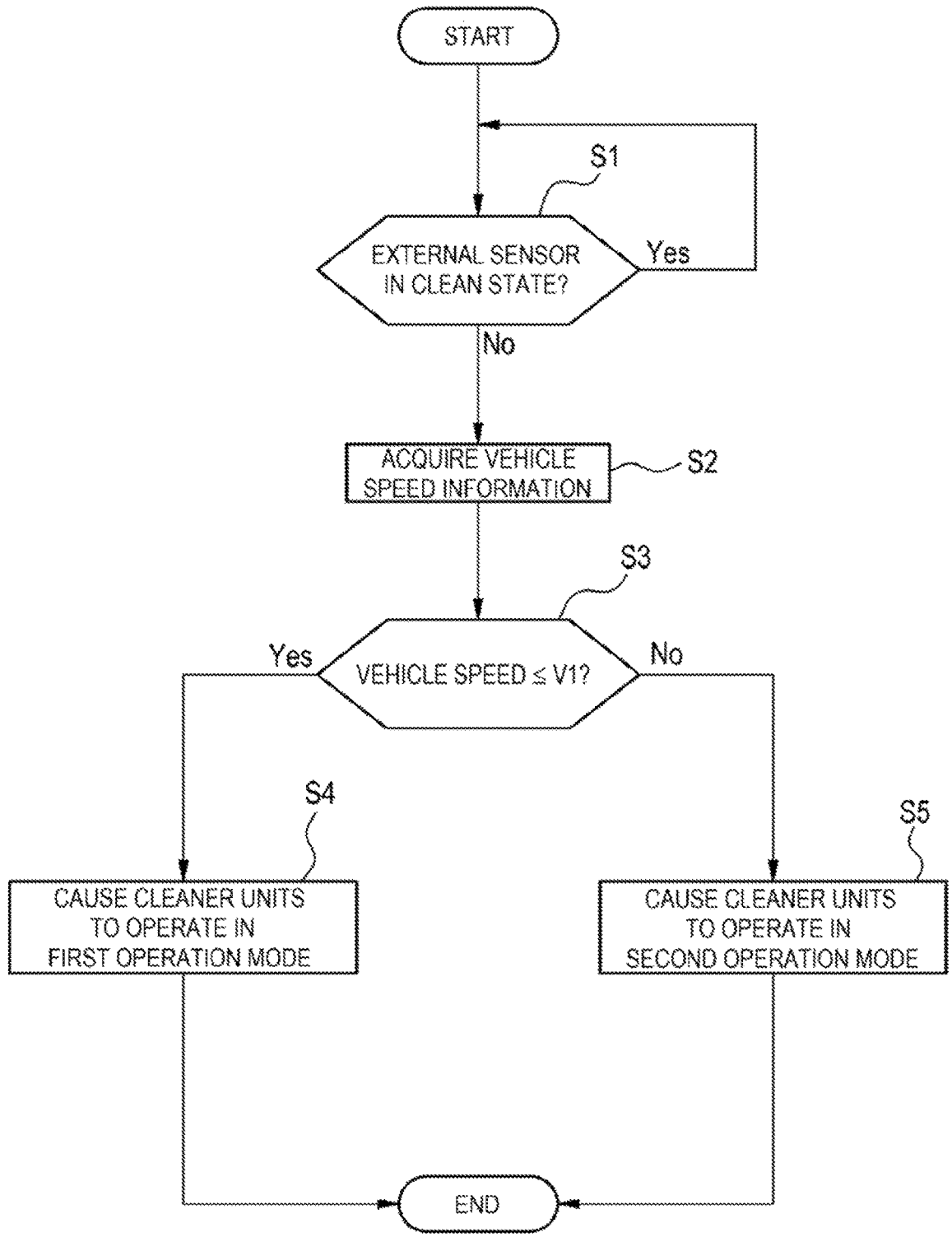
FIG. 5 is a flowchart executed by the vehicle cleaner system according to the first embodiment.

FIG. 5 is a flowchart showing an example of a process executed by the cleaner control unit 116.

As shown in FIG. 5, in step S1, the cleaner control unit 116 determines whether the external sensor 6 is in the clean state based on the output of the dirt sensor 133. For example, the cleaner control unit 116 determines whether the front LiDAR 6f is in the clean state in accordance with the output of the dirt sensor 133 that detects the dirt of the front LiDAR 6f. Alternatively, the front LC 103 may be configured to transmit a signal notifying whether the front LiDAR 6f needs to be cleaned to the cleaner control unit 116 in accordance with the output of the dirt sensor 133, and the cleaner control unit 116 may be configured to determine whether the front LiDAR 6f is in the clean state in accordance with the signal of the front LC 103. Similarly to the front LC 103, the cleaner control unit 116 determines whether the external sensor 6 to be cleaned is in the clean state for the other cleaner units 110.

In a case where it is determined in step S1 that the external sensor 6 is in the clean state (Yes in step S1), the cleaner control unit 116 repeats the process of step S1 until it is determined that the external sensor 6 is not in the clean state.

On the other hand, in a case where it is determined in step S1 that the external sensor 6 is not in the clean state (No in step S1), in step S2, the cleaner control unit 116 acquires the vehicle speed information from the vehicle speed sensor 5 in the vehicle speed information acquisition unit 121 in step S2. Subsequently, in step S3, the cleaner control unit 116 determines whether the vehicle speed of the vehicle 1 is equal to or smaller than a predetermined value V1 based on the vehicle speed information acquired by the vehicle speed information acquisition unit 121.

When the vehicle speed is determined as equal to or smaller than the predetermined value V1 (Yes in step S3), the cleaner control unit 116 causes the cleaner units 110 to operate in a first operation mode in step S4. On the other hand, when the vehicle speed is determined as larger than the predetermined value V1 (No in step S3), the cleaner control unit 116 causes the cleaner units 110 to operate in a second operation mode in step S5.

FIG. 6 is a view showing the timings of discharging the cleaning liquid from the liquid nozzle 132 when the cleaner units 110 are operated in the first operation mode and when the cleaner unit 110 are operated in the second operation mode. As shown in FIG. 6, for example, in the first operation mode when the vehicle speed is equal to or smaller than V1, the cleaner control unit 116 causes the cleaner units 110 to operate such that the cleaning liquid is discharged six times at a predetermined interval from the liquid nozzles 132. In the second operation mode when the vehicle speed is larger than V1, the cleaner control unit 116 causes the cleaner units 110 to operate such that the cleaning liquid is discharged three times at a predetermined interval from the liquid nozzles 132. In this way, the cleaner control unit 116 causes the cleaner units 110 to operate such that the number of times of discharge of the cleaning liquid varies between the first operation mode and the second operation mode. For example, when the vehicle speed is larger than V1, it is considered that the front LiDAR 6f and the front camera 6c, which are the external sensors 6 mounted on the front side of the vehicle 1, are likely to keep a clean state under influence of traveling wind. Therefore, for example, when the front LC 103 and the front camera cleaner 109a operate as the cleaner units 110, it is preferable to reduce the number of times of discharge of the cleaning liquid in the second operation mode which is selected when the vehicle speed is larger than V1 as compared with the first operation mode which is selected when the vehicle speed is equal to or smaller than V1, so as to reduce consumption of the cleaning liquid.

In step S4 and step S5, the cleaner control unit 116 may drive at least one of the cleaner units 110, or may cause all the cleaner units 110 to operate. In the first place, since the sensitivity of the external sensor 6 that acquires the external information in front is required when the automatic driving mode is executed, it is preferable to operate at least the front camera cleaner 109a for cleaning the front camera 6c that acquires the information on the front side of the vehicle and the front LC 103 for cleaning the front LiDAR 6f.

As described above, according to the vehicle cleaner system 100 according to the first embodiment, the cleaner control unit 116 controls the cleaner units 110 such that the number of times of discharge of the cleaning liquid varies in accordance with the vehicle speed information acquired by the vehicle speed information acquisition unit 121. According to this configuration, it is possible to select a cleaning condition suitable for cleaning the external sensor 6 by the cleaner unit 110 based on the vehicle speed, and to prevent consumption of the cleaning unit 110 and consumption of the cleaning liquid while keeping the external sensor 6 in a clean state.

In the example of the first embodiment, the cleaner control unit 116 varies the number of times of discharge of the cleaning liquid discharged from the liquid nozzle 132 in the first operation mode and the second operation mode, but is not limited to this example. For example, the cleaner control unit 116 may control the cleaner unit 110 such that at least one of the discharge amount of the cleaning liquid, the discharge amount per unit time of the cleaning liquid, the number of times of discharge per unit time of the cleaning liquid, and the discharge time of the cleaning liquid varies between the first operation mode and the second operation mode.

FIG. 7 is a view showing timings of discharging the cleaning liquid in the first operation mode and the second operation mode according to Modification 1. As shown in FIG. 7, the cleaner control unit 116 may cause the cleaner units 110 to operate such that the cleaning liquid is continuously discharged during a time T1 in the first operation mode, and cause the cleaner units 110 to operate such that the cleaning liquid is continuously discharged during a time T2 shorter than the time T1 in the second operation mode. For example, when the front LC 103 and the front camera cleaner 109a operate as the cleaner units 110, it is preferable to reduce a discharge time of the cleaning liquid in the second operation mode which is selected when the vehicle speed is larger than V1 as compared with the first operation mode which is selected when the vehicle speed is equal to or smaller than V1, so as to reduce consumption of the cleaning liquid.

Figure 8A:
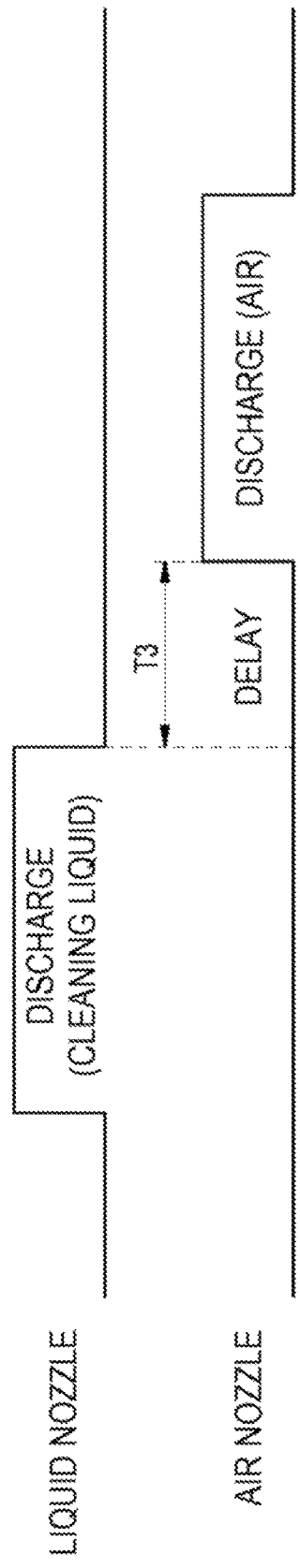
FIG. 8A is a view showing a cleaning method in the first operation mode of the cleaner unit executed by a vehicle cleaner system according to Modification 2.
Figure 8B:
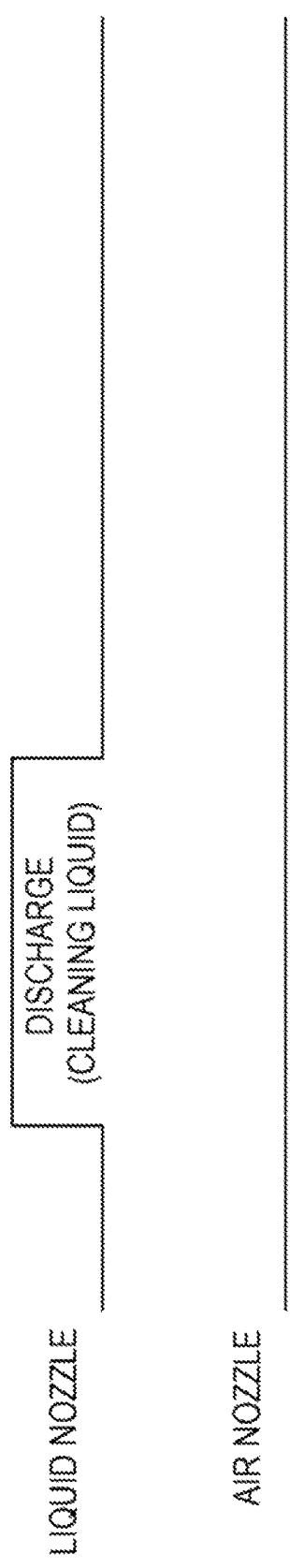
FIG. 8B is a view showing a cleaning method in the second operation mode of the cleaner unit executed by the vehicle cleaner system according to Modification 2.

FIG. 8A is a view showing discharge timings of the cleaning liquid and the air in the first operation mode according to Modification 2, and FIG. 8B is a view showing the discharge timings of the cleaning liquid and the air in the second operation mode according to Modification 2.

As shown in FIG. 8A, for example, in the first operation mode, the cleaner control unit 116 may discharge the cleaning liquid from the liquid nozzle 132 toward the external sensor 6 and then discharge the air from the air nozzle 131 toward the external sensor 6. The cleaner control unit 116 discharges air (for example, high-pressure air) from the air nozzle 131 after a lapse of predetermined time T3 from a time point when the cleaning of the external sensor 6 with the cleaning liquid is completed. That is, the discharge of the air is performed with a delay of the time T3 from the time point when the cleaning of the external sensor 6 by the discharge of the cleaning liquid is completed. According to such a method, the dirt of the external sensor 6 can be cleaned with the cleaning liquid, and further the cleaning liquid adhered to the external sensor 6 can be blown away by the air, so that the external sensor 6 can be brought into the clean state.

On the other hand, as shown in FIG. 8B, in the second operation mode, the cleaner control unit 116 may not discharge the air from the air nozzle 131 after discharging the cleaning liquid from the liquid nozzle 132 toward the external sensor 6.

In this manner, the cleaner control unit 116 may control the cleaner units 110 such that at least one of the discharge amount of the air discharged from the air nozzle 131, the discharge amount of the air per unit time, the number of times of discharge of the air, the number of times of discharge of the air per unit time, and the discharge time of the air varies according to the vehicle speed information As described above, when the vehicle speed is larger than V1, since the front LiDAR 6f and the front camera 6c, which are the external sensors 6 mounted on the front side of the vehicle 1, are affected by the traveling wind, the cleaning liquid adhering to the external sensor 6 can be blown off by the air without discharging the air after the cleaning liquid is discharged. Therefore, by changing the discharge mode of the air according to the vehicle speed, it is possible to select a cleaning condition suitable for cleaning the external sensor 6 by the cleaner unit 110 based on the vehicle speed, and to prevent consumption of the cleaning unit 110 while keeping the external sensor 6 in the clean state.

Figure 9:
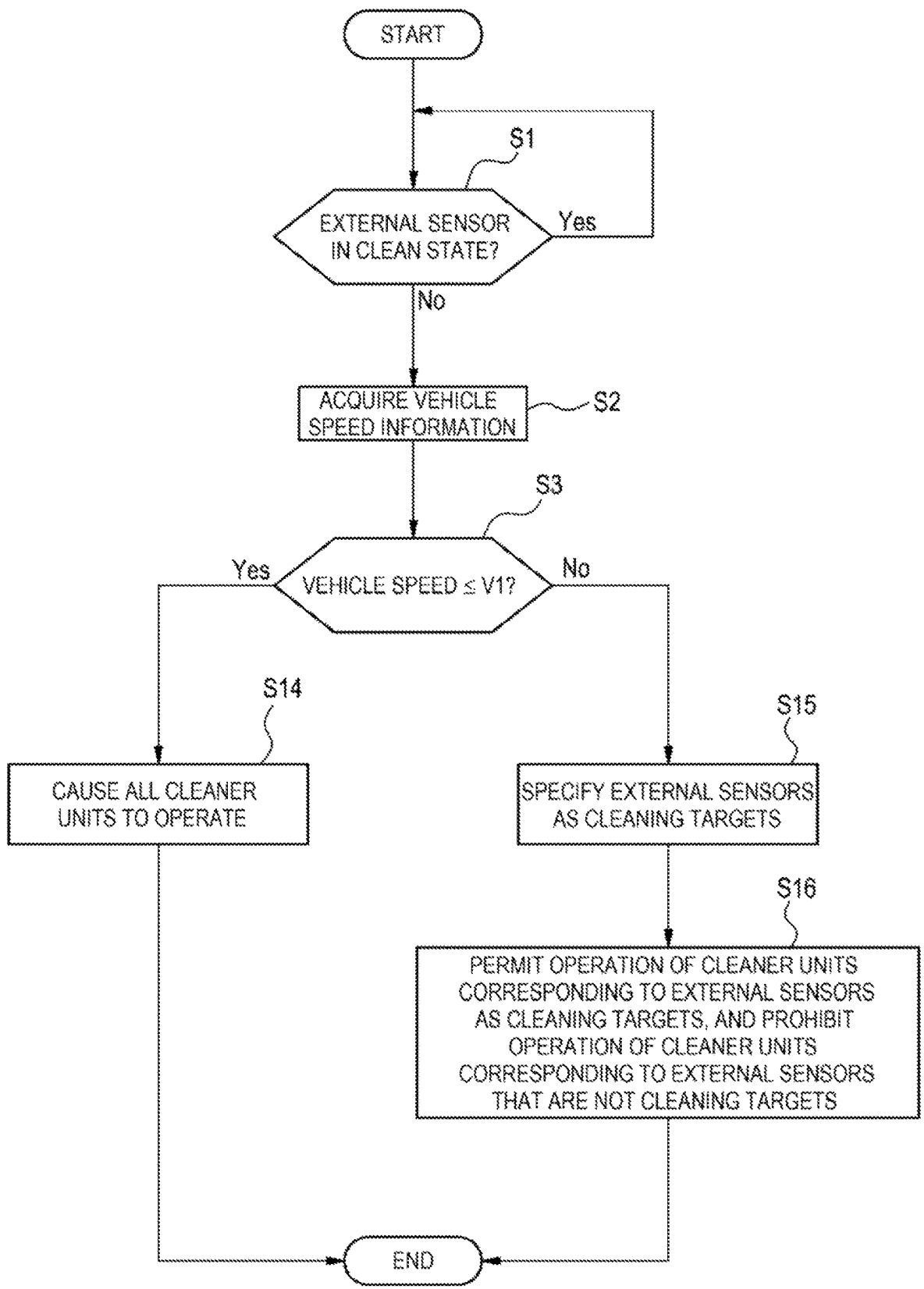
FIG. 9 is a flowchart executed by a vehicle cleaner system according to Modification 3.

FIG. 9 is a flowchart showing a process executed by the cleaner control unit 116 according to Modification 3.

In Modification 3 shown in FIG. 9, steps S1 to S3 are the same as the example of the process shown in FIG. 5, and thus the description thereof is omitted.

When the vehicle speed is determined as equal to or smaller than the predetermined value V1 (Yes in step S3), the cleaner control unit 116 causes all the cleaner units 110 to operate in step S14. That is, the cleaner control unit 116 cleans all the external sensors 6.

On the other hand, when the vehicle speed is determined as larger than the predetermined value V1 (No in step S3), the cleaner control unit 116 specifies the external sensors 6 as cleaning targets among the plurality of external sensors 6 mounted on the vehicle 1 in step S15. In this example, the cleaner control unit 116 specifies the front LiDAR 6f and the front camera 6c, which are disposed on the front side of the vehicle 1 and acquire information of the front region of the vehicle 1 (an example of the first region), as the external sensors 6 to be cleaned among the front LiDAR 6f, the rear LiDAR 6b, the right LiDAR 6r, the left LiDAR 61, the front camera 6c, and the rear camera 6d.

Next, in step S16, the cleaner control unit 116 permits the operation of the cleaner units 110 corresponding to the external sensors 6 as the specified cleaning targets (the front LiDAR 6f and the front camera 6c), and prohibits the operation of the cleaner units 110 corresponding to the external sensors 6 that are not the cleaning targets (the rear LiDAR 6b, the right LiDAR 6r, the left LiDAR 61, and the rear camera 6d). As a result, the front LiDAR cleaner 103 and the front camera cleaner 109a, which respectively corresponding to the front LiDAR 6f and the front camera 6c as the cleaning targets, operate, and at least one of the cleaning liquid and the air is discharged only to the front LiDAR 6f and the front camera 6c.

As described above, according to the vehicle cleaner system 100 according to Modification 3, the cleaner control unit 116 acquires the vehicle speed information related to the traveling speed of the vehicle 1, and permits the operation of the cleaner units 110 (an example of the first cleaner unit) corresponding to the external sensors 6 that acquire information of the front region (an example of the first region) of the vehicle 1 and prohibits the operation of the cleaner units 110 (an example of the second cleaner unit) corresponding to the external sensors 6 that acquire information of the rear and lateral regions (an example of the second region) of the vehicle 1 when the vehicle speed is equal to or larger than the predetermined value V1. For example, since the information of the rear region of the vehicle 1 is not necessary when the vehicle 1 is traveling at high speed, the operation of the external sensors 6 mounted on the rear of the vehicle (the rear LiDAR 6b and the rear camera 6d) is prohibited, so that the consumption of the cleaner unit 110 and the consumption of the cleaning liquid can be prevented.

Second Embodiment

Hereinafter, a vehicle cleaner system according to a second embodiment will be described with reference to the drawings. Incidentally, members having the same reference numbers as members that have been described in the description of the first embodiment will be omitted for convenience of description.

Figure 10:
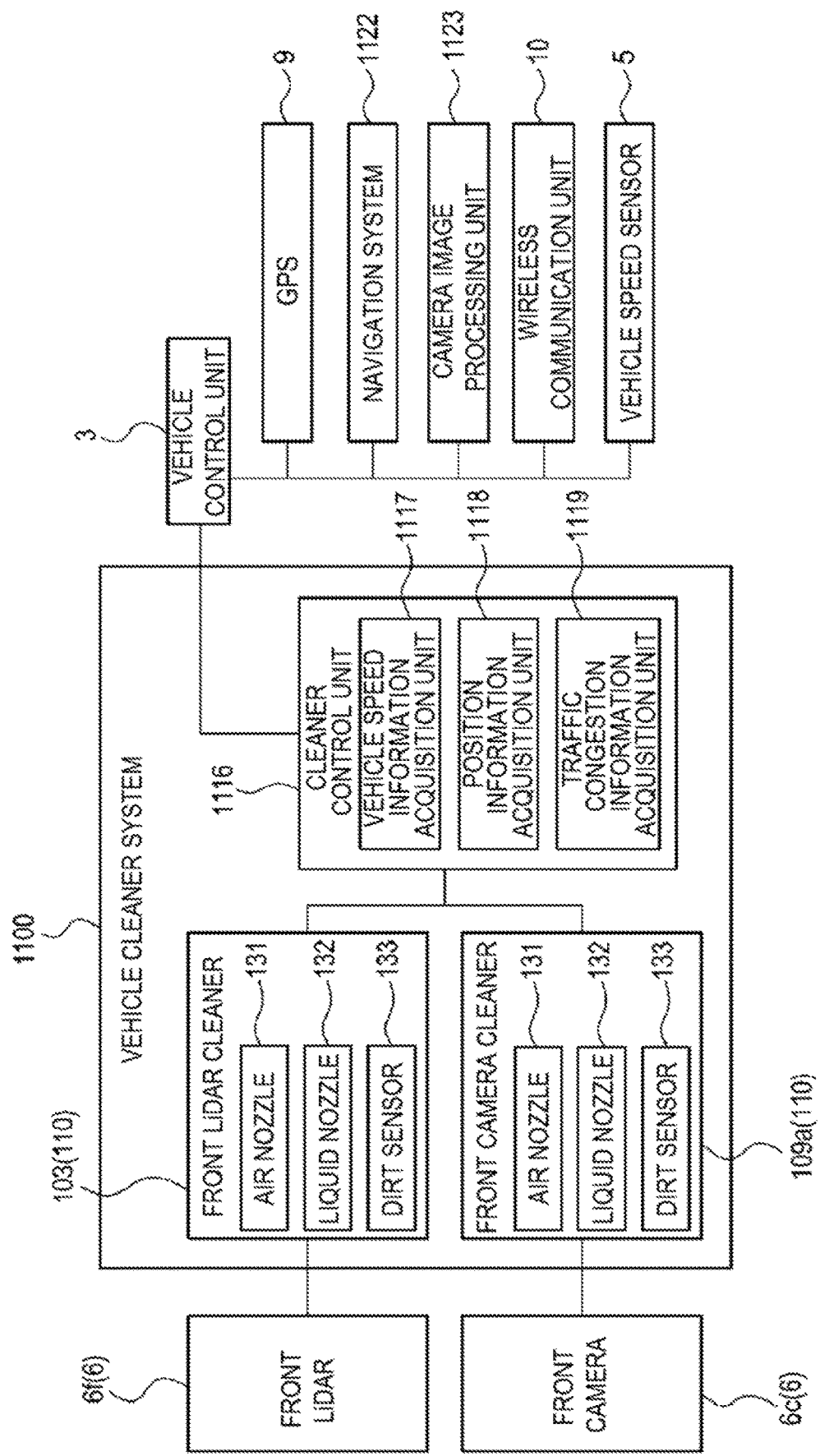
FIG. 10 is a block diagram of a main part of a vehicle cleaner system according to a second embodiment.

FIG. 10 is a block diagram of a main part of a vehicle cleaner system 1100 according to the second embodiment. As shown in FIG. 10, the vehicle cleaner system 1100 includes the cleaner units 110 that clean the external sensors 6, and a cleaner control unit 1116 that controls the operation of the cleaner units 110. Although only the front LC 103 and the front camera cleaner 109a are shown as the cleaner units 110 in FIG. 10, it is needless to say that the vehicle cleaner system 1100 includes the other cleaner units 110 as shown in FIG. 3.

The front LC 103 and the front camera cleaner 109a each have the air nozzle 131 that discharges air (for example, high-pressure air) as the cleaning medium to the external sensor 6, the liquid nozzle 132 that discharges the cleaning liquid as the cleaning medium to the external sensor 6, and the dirt sensor 133 that detects the dirt on the external sensor 6. Specifically, the front LC 103 includes the air nozzle 131 that discharges air as the cleaning medium to the front LiDAR 6f, the liquid nozzle 132 that discharges the cleaning liquid as the cleaning medium to the front LiDAR 6f, and the dirt sensor 133 that detects the dirt on the front LiDAR 6f. Similarly, the front camera cleaner 109a and the other cleaner units 110 also include the air nozzle 131, the liquid nozzle 132, and the dirt sensor 133.

The cleaner control unit 1116 is connected to the front LC 103 and the front camera cleaner 109a, respectively. The cleaner control unit 1116 is configured to control each cleaner unit 110. The cleaner control unit 1116 is configured with, for example, at least one electronic control unit (ECU). The electronic control unit may include at least one microcontroller including one or more processors and one or more memories, and other electronic circuits including active elements such as transistors and passive elements. The processor is, for example, a central processing unit (CPU), a micro processing unit (MPU), and/or a graphics processing unit (GPU). The CPU may be configured with a plurality of CPU cores. The GPU may be configured with a plurality of GPU cores. The memory includes a read only memory (ROM) and a random access memory (RAM). A control program for the cleaner unit 110 may be stored in the ROM.

The processor may be configured to load a program designated from a program group stored in the ROM onto the RAM and execute various processes in cooperation with the RAM. In addition, the electronic control unit (ECU) may be configured by an integrated circuit (hardware resource) such as an application specific integrated circuit (ASIC) or a field-programmable gate array (FPGA). Further, the electronic control unit may be configured by a combination of at least one microcontroller and an integrated circuit.

The cleaner control unit 1116 includes a vehicle speed information acquisition unit 1117, a position information acquisition unit 1118, and a traffic congestion information acquisition unit 1119. The vehicle speed information acquisition unit 1117 acquires the traveling speed of the vehicle 1 (vehicle speed). The vehicle speed information acquisition unit 1117 is connected to the vehicle speed sensor 5 as the external sensor, and acquires the vehicle speed information. The position information acquisition unit 1118 is connected to the GPS 9, and acquires current position information of the vehicle 1 (vehicle position information) output from the GPS 9. The traffic congestion information acquisition unit 1119 is connected to at least one of a navigation system 1122 and the wireless communication unit 10, and acquires traffic congestion information output from at least one of the navigation system 1122 and the wireless communication unit 10. The navigation system 1122 and the wireless communication unit 10 acquire VICS information from the outside of the vehicle, and output the traffic congestion information around the vehicle 1 to the traffic congestion information acquisition unit 1119 based on the acquired VICS information, for example. The vehicle speed information acquisition unit 1117, the position information acquisition unit 1118, and the traffic congestion information acquisition unit 1119 may respectively acquire the vehicle speed information, the current position information, and the traffic congestion information from the vehicle speed sensor 5, the GPS 9, and the navigation system 1122 (or the wireless communication unit 10) via the vehicle control unit 3.

Figure 11:
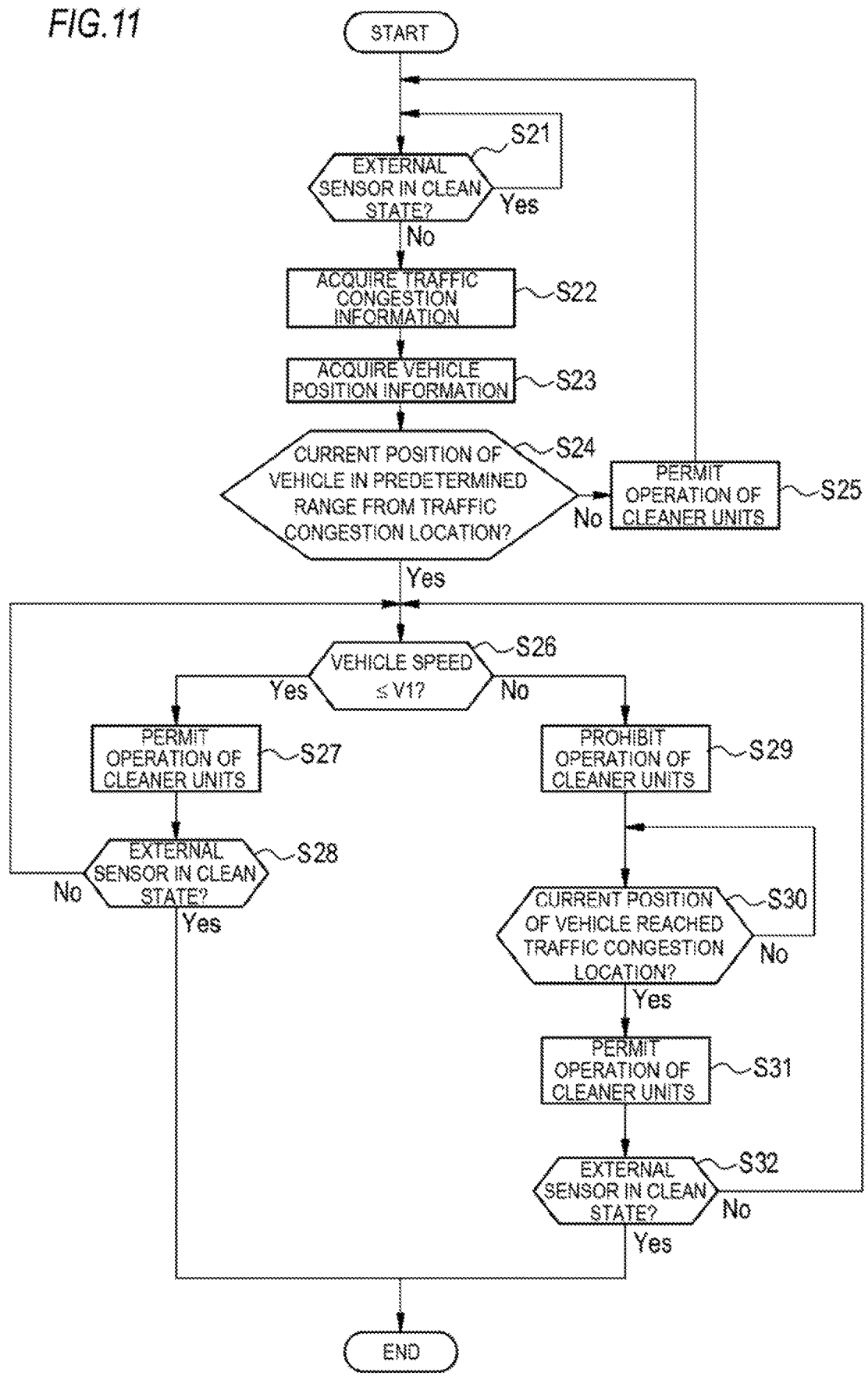
FIG. 11 is a flowchart executed by the vehicle cleaner system.

FIG. 11 is a flowchart showing an example of a process executed by the cleaner control unit 1116.

As shown in FIG. 11, in step S21, the cleaner control unit 1116 determines whether the external sensor 6 is in the clean state based on the output of the dirt sensor 133. For example, the cleaner control unit 1116 determines whether the front LiDAR 6f is in the clean state in accordance with the output of the dirt sensor 133 that detects the dirt of the front LiDAR 6f. Alternatively, the front LC 103 may be configured to transmit a signal notifying whether the front LiDAR 6f needs to be cleaned to the cleaner control unit 1116 in accordance with the output of the dirt sensor 133, and the cleaner control unit 1116 may be configured to determine whether the front LiDAR 6f is in the clean state in accordance with the signal of the front LC 103. Similarly to the front LC 103, the cleaner control unit 1116 determines whether the external sensor 6 to be cleaned is in the clean state for the other cleaner units 110.

In a case where it is determined that the external sensor 6 is in the clean state (Yes in step S21), the cleaner control unit 1116 repeats the process of step S21 until it is determined that the external sensor 6 is not in the clean state.

On the other hand, in a case where it is determined that the external sensor 6 is not in the clean state (No in step S21), in step S22, the cleaner control unit 1116 acquires the traffic congestion information in the traffic congestion information acquisition unit 1119. The traffic congestion information can be acquired from, for example, the VICS information, inter-vehicle communication information, road-to-vehicle communication information, and the like.

Subsequently, in step S23, the cleaner control unit 1116 acquires the vehicle position information of the vehicle 1 in the position information acquisition unit 1118.

Figure 12:
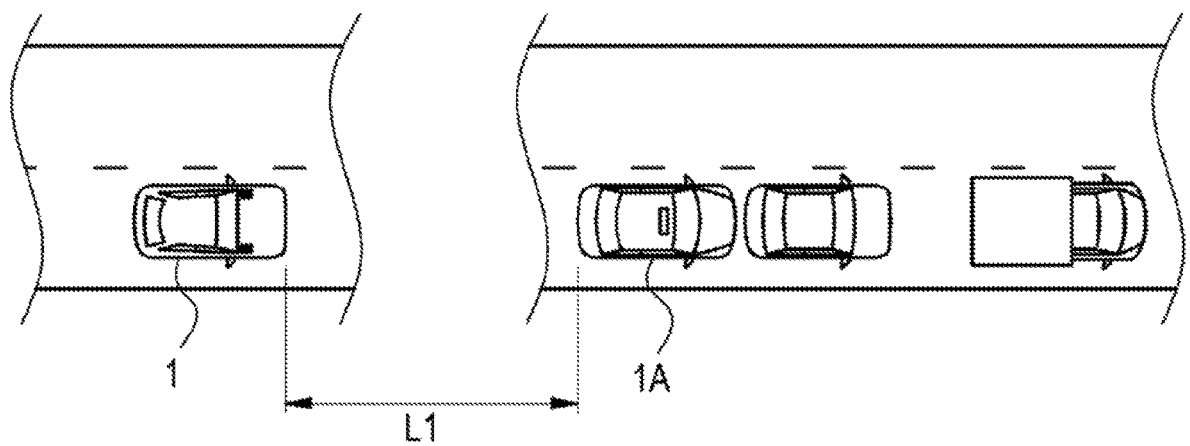
FIG. 12 is a schematic view showing a state in which a vehicle approaches a traffic congestion location.

Subsequently, in step S24, the cleaner control unit 1116 determines whether the current position of the vehicle 1 is within a predetermined range from the traffic congestion location based on the acquired traffic congestion information and vehicle position information. Specifically, as shown in FIG. 12, the cleaner control unit 1116 determines whether a distance from a vehicle 1A at the end of the traffic congestion location to the host vehicle 1 is equal to or smaller than a predetermined value L1 (for example, 2 km). The cleaner control unit 1116 can accurately specify the current position of the vehicle 1 based on the vehicle position information acquired from the GPS 9 and the vehicle speed information acquired from the vehicle speed sensor 5. Further, the cleaner control unit 1116 can appropriately change the predetermined value L1 in accordance with the traveling road condition and the weather condition. For example, when the vehicle 1 is traveling on a highway (an expressway), it is required to maintain high sensitivity of the sensor, so that it is preferable to increase the predetermined value L1 as compared with a case of traveling on a general road. In addition, since highly sensitive sensing is required also in the case of rainy weather, it is preferable to increase the predetermined value L1 as compared with the case of sunny weather.

When it is determined that the current position of the vehicle 1 is not within the predetermined range from the traffic congestion location (No in step S24), the cleaner control unit 1116 permits the operation of the cleaner unit 110 in step S25. As a result, the cleaner unit 110 operates, and at least one of the air and the cleaning liquid is injected from at least one of the air nozzle 131 or the liquid nozzle 132 to the external sensor 6. Thereafter, the cleaner control unit 1116 returns the process to step S21.

On the other hand, when it is determined that the current position of the vehicle 1 is within the predetermined range from the traffic congestion location (Yes in Step S24), the cleaner control unit 1116 determines whether the traveling speed of the vehicle 1 (vehicle speed) of the vehicle 1 is equal to or smaller than the predetermined value V1 (for example, 30 km/h) based on the vehicle speed information acquired by the vehicle speed information acquisition unit 1117 in step S26.

When the vehicle speed is determined as equal to or smaller than the predetermined value V1 (Yes in step S26), the cleaner control unit 1116 permits the operation of the cleaner unit 110 in step S27. As a result, the cleaner unit 110 operates, and at least one of the air and the cleaning liquid is injected from at least one of the air nozzle 131 or the liquid nozzle 132 to the external sensor 6.

Subsequently, in step S28, the cleaner control unit 1116 determines whether the external sensor 6 is in the clean state based on the output of the dirt sensor 133. In a case where it is determined that the external sensor 6 is in the clean state (Yes in step S28), the cleaner control unit 1116 ends the processing. On the other hand, when it is determined that the external sensor 6 is not in the clean state (No in step S28), the cleaner control unit 1116 returns the process to step S26.

When it is determined in step S26 that the vehicle speed is larger than the predetermined value V1 (No in step S26), the cleaner control unit 1116 prohibits the operation of the cleaner unit 110 in step S29. That is, in this state, the external sensor 6 is not cleaned.

Figure 13:
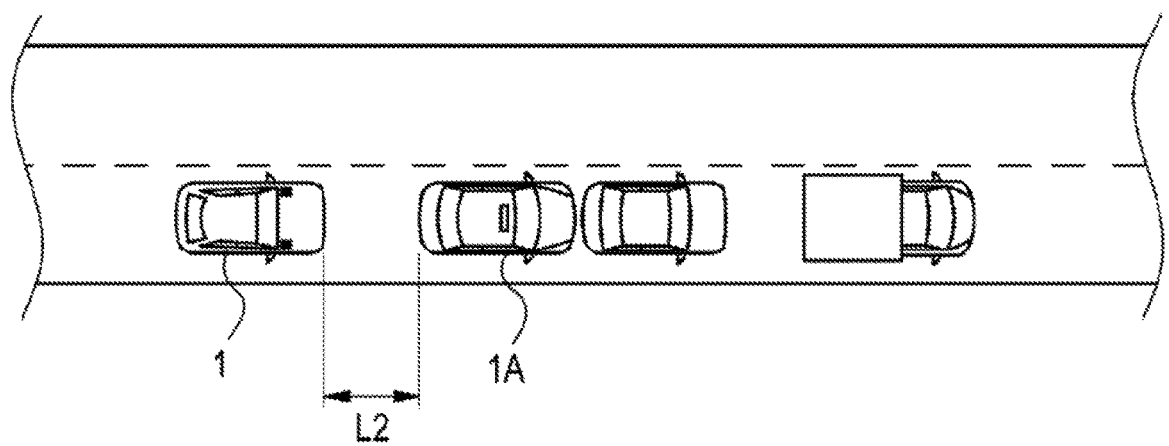
FIG. 13 is a schematic view showing a state in which the vehicle reaches an end of the traffic congestion location.

Subsequently, in step S30, the cleaner control unit 1116 determines whether the current position of the vehicle 1 reaches the end of the traffic congestion location. Whether the vehicle 1 reaches the end of the traffic congestion location can be determined based on the distance between the vehicle 1 and the vehicle 1A at the end of the traffic congestion location and/or the change in the vehicle speed of the vehicle 1. For example, as shown in FIG. 13, when the distance from the end of the vehicle 1A to the host vehicle 1 is equal to or smaller than a predetermined value L2 (e.g., 5 m), the cleaner control unit 1116 determines that the vehicle 1 reaches the end of the traffic congestion location. The cleaner control unit 1116 can acquire information related to the distance between the vehicle 1A and the host vehicle 1 from a camera image processing unit 1123 (see FIG. 10), for example. The cleaner control unit 1116 may directly acquire information related to the distance between the vehicle 1A and the host vehicle 1 from the front LiDAR 6f or the front camera 6c as the external sensor 6. In addition to the case where the distance from the vehicle 1A to the host vehicle 1 is equal to or smaller than the predetermined value L2 or instead of the case where the distance from the vehicle 1A to the vehicle 1 is equal to or smaller than the predetermined value L2, the cleaner control unit 1116 may determine that the vehicle 1 reaches the end of the traffic congestion location in a case where the vehicle speed of the vehicle 1 is equal to or smaller than a predetermined value (for example, 5 km/h).

When it is determined that the vehicle 1 does not reach the end of the traffic congestion location (No in step S30), the cleaner control unit 1116 repeats the process of step S30 until it is determined that the vehicle 1 reaches the end of the traffic congestion location.

On the other hand, when it is determined that the vehicle 1 reaches the end of the traffic congestion location (Yes in step S30), the cleaner control unit 1116 permits the operation of the cleaner unit 110 in step S31. As a result, the cleaner unit 110 operates, and at least one of the air and the cleaning liquid is injected from at least one of the air nozzle 131 or the liquid nozzle 132 to the external sensor 6.

Subsequently, in step S32, the cleaner control unit 1116 determines whether the external sensor 6 is in the clean state based on the output of the dirt sensor 133. In a case where it is determined that the external sensor 6 is in the clean state (Yes in step S32), the cleaner control unit 1116 ends the processing. On the other hand, when it is determined that the external sensor 6 is not in the clean state (No in step S32), the cleaner control unit 1116 returns the process to step S26.

In step S25, step S27, and step S31, the cleaner control unit 1116 may permit the operation of at least one cleaner unit 110, or may permit the operation of all the cleaner units 110. In the first place, since the sensitivity of the external sensor 6 that acquires the external information in front is required when the automatic driving mode is executed, it is preferable to operate at least the front camera cleaner 109a for cleaning the front camera 6c that acquires the information on the front side of the vehicle and the front LC 103 for cleaning the front LiDAR 6f.

When the vehicle 1 travels at a low speed, it is often not required to maintain the sensitivity as compared with a case where the vehicle 1 travels at a high speed. Therefore, when the vehicle 1 travels at a low speed, even if the cleaner unit 110 operates to spray the cleaning liquid or air onto the external sensor 6, the cleaning liquid or the like is less likely to interfere with sensing. On the other hand, when the vehicle 1 travels at high speed, it is required to maintain high sensitivity, but the sensitivity may be lowered so that the required sensitivity may not be satisfied while the cleaner unit 110 operates to spray the cleaning liquid or air onto the external sensor 6.

Therefore, according to the vehicle cleaner system 1100 according to the second embodiment, the cleaner control unit 1116 acquires the vehicle speed information of the vehicle 1, permits the operation of the cleaner unit 110 when the vehicle speed is equal to or smaller than the predetermined value V1, and prohibits the operation of the cleaner unit 110 when the vehicle speed is larger than the predetermined value V1. According to such a configuration, since the operation of the cleaner unit 110 is prohibited at the timing when it is required to maintain high sensitivity of the external sensor 6, it is possible to prevent the sensitivity of the external sensor 6 from decreasing due to the cleaning liquid or air injected from the cleaner unit 110 and not satisfying the required sensitivity. On the other hand, since the operation of the cleaner unit 110 is permitted at a timing when the sensitivity is not required so much, the external sensor 6 can be cleaned to maintain the cleaning state of the external sensor 6.

In particular, when the cleaner control unit 1116 acquires the vehicle position information of the vehicle 1 and the traffic congestion information, and determines whether the cleaner unit 110 is operable based on the vehicle speed of the vehicle 1 when the vehicle 1 is determined as located within the predetermined range L1 from the traffic congestion location. In a situation where the vehicle 1 is approaching the traffic congestion location at a high speed, it is required to maintain a high sensitivity of the external sensor 6. Therefore, when the vehicle 1 is located within the predetermined range L1 from the traffic congestion location and the vehicle speed is larger than the predetermined value V1, it is preferable to prohibit the operation of the cleaner unit 110 even when it is determined that the external sensor 6 is not in the clean state, so as to securely prevent the sensitivity of the external sensor 6 from decreasing due to the cleaning liquid or the like injected from the cleaner unit 110 and not satisfying the required sensitivity.

According to the vehicle cleaner system 1100 of the second embodiment, the cleaner control unit 1116 is configured to permit the operation of the cleaner unit 110 when the vehicle 1 is determined as reaching the end of the traffic congestion location. In a case where the vehicle 1 reaches the traffic congestion location, since high sensitivity sensing by the external sensor 6 is not required in many cases, the operation of the cleaner unit 110 can be permitted so as to clean the external sensor 6.

Third Embodiment

Hereinafter, a vehicle cleaner system according to a third embodiment will be described with reference to the drawings. Incidentally, members having the same reference numbers as members that have been described in the description of the first embodiment will be omitted for convenience of description.

Figure 14:
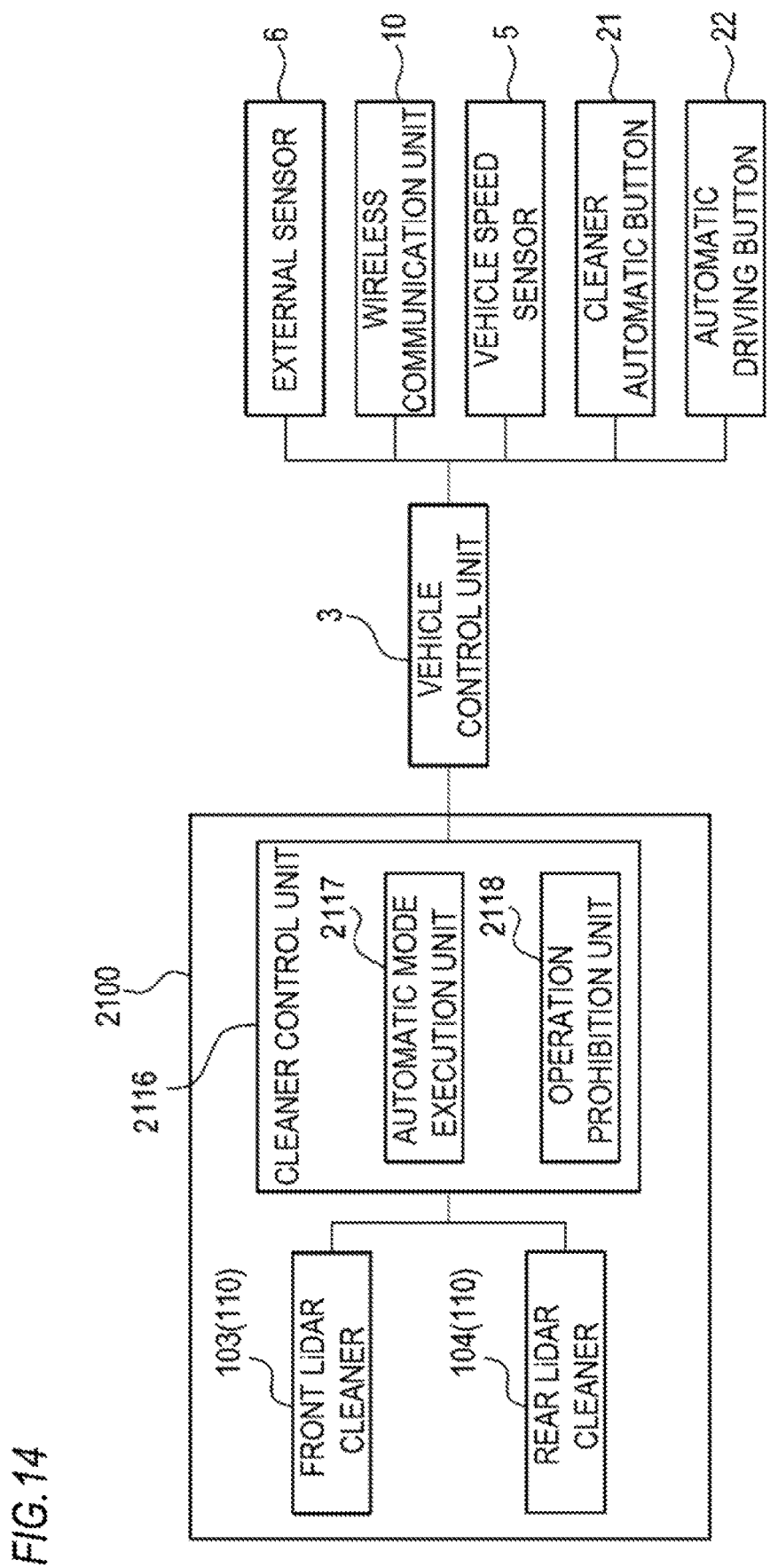
FIG. 14 is a block diagram of a main part of a vehicle cleaner system according to a third embodiment.

FIG. 14 is a block diagram of a main part of a vehicle cleaner system 2100 according to the third embodiment. As shown in FIG. 14, the vehicle cleaner system 2100 includes the cleaner units 110 that clean the external sensors 6, and a cleaner control unit 2116 that controls the operation of the cleaner units 110. Although only the front LC 103 and the rear LC 104 are shown as the cleaner units 110 in FIG. 14, it is needless to say that the vehicle cleaner system 2100 includes the other cleaner units 110 as shown in FIG. 3.

The cleaner control unit 2116 (an example of a vehicle cleaner control device) is configured to control each cleaner unit 110. The cleaner control unit 2116 is configured with, for example, at least one electronic control unit (ECU). The electronic control unit may include at least one microcontroller including one or more processors and one or more memories, and other electronic circuits including active elements such as transistors and passive elements. The processor is, for example, a central processing unit (CPU), a micro processing unit (MPU), and/or a graphics processing unit (GPU). The CPU may be configured with a plurality of CPU cores. The GPU may be configured with a plurality of GPU cores. The memory includes a read only memory (ROM) and a random access memory (RAM). A control program for the cleaner unit 110 may be stored in the ROM.

The processor may be configured to load a program designated from a program group stored in the ROM onto the RAM and execute various processes in cooperation with the RAM. In addition, the electronic control unit (ECU) may be configured by an integrated circuit (hardware resource) such as an application specific integrated circuit (ASIC) or a field-programmable gate array (FPGA). Further, the electronic control unit may be configured by a combination of at least one microcontroller and an integrated circuit.

The cleaner control unit 2116 is connected to the vehicle control unit 3. The vehicle control unit 3 previously stores information of a braking distance corresponding to the vehicle speed and a maximum detection distance of the external sensor 6, and outputs these pieces of information in response to a request from the cleaner control unit 2116.

The cleaner control unit 2116 is connected to the external sensors 6 (camera, radar, LiDAR, etc.), the wireless communication unit 10, the vehicle speed sensor 5, a cleaner automatic button 21, and an automatic driving button 22 via the vehicle control unit 3.

The external sensor 6 (camera, radar, LiDAR, etc.) acquires information of a distance to an obstacle ahead of the vehicle 1 (for example, a preceding vehicle traveling ahead of the vehicle 1), and outputs this information as obstacle information to the vehicle control unit 3. The wireless communication unit 10 receives infrastructure information from an infrastructure by road-to-vehicle communication, and outputs to the vehicle control unit 3 an automatic driving available signal that notifies that the host vehicle 1 enters a region in which the vehicle is permitted to travel in an automatic driving mode (hereinafter, referred to as an automatic driving available range). The wireless communication unit 10 acquires the infrastructure information from the infrastructure by road-to-vehicle communication from the infrastructure, traveling information of the preceding vehicle by inter-vehicle communication, and road traffic information (for example, traffic congestion information and traffic regulation information) from VICS, and outputs these pieces of information as obstacle information to the vehicle control unit 3. The vehicle speed sensor 5 detects the traveling speed of the host vehicle 1 (vehicle speed) and outputs the vehicle speed information to the vehicle control unit 3. When operated by the user, the cleaner automatic button 21 outputs a cleaner automatic signal to the vehicle control unit 3. When operated by the user, the automatic driving button 22 outputs an automatic driving signal to the vehicle control unit 3. The information output to the vehicle control unit 3 is output to the cleaner control unit 2116 as appropriate. The cleaner automatic button 21 and the automatic driving button 22 can be configured with switches, levers, touch displays, or the like, instead of buttons.

Figure 15:
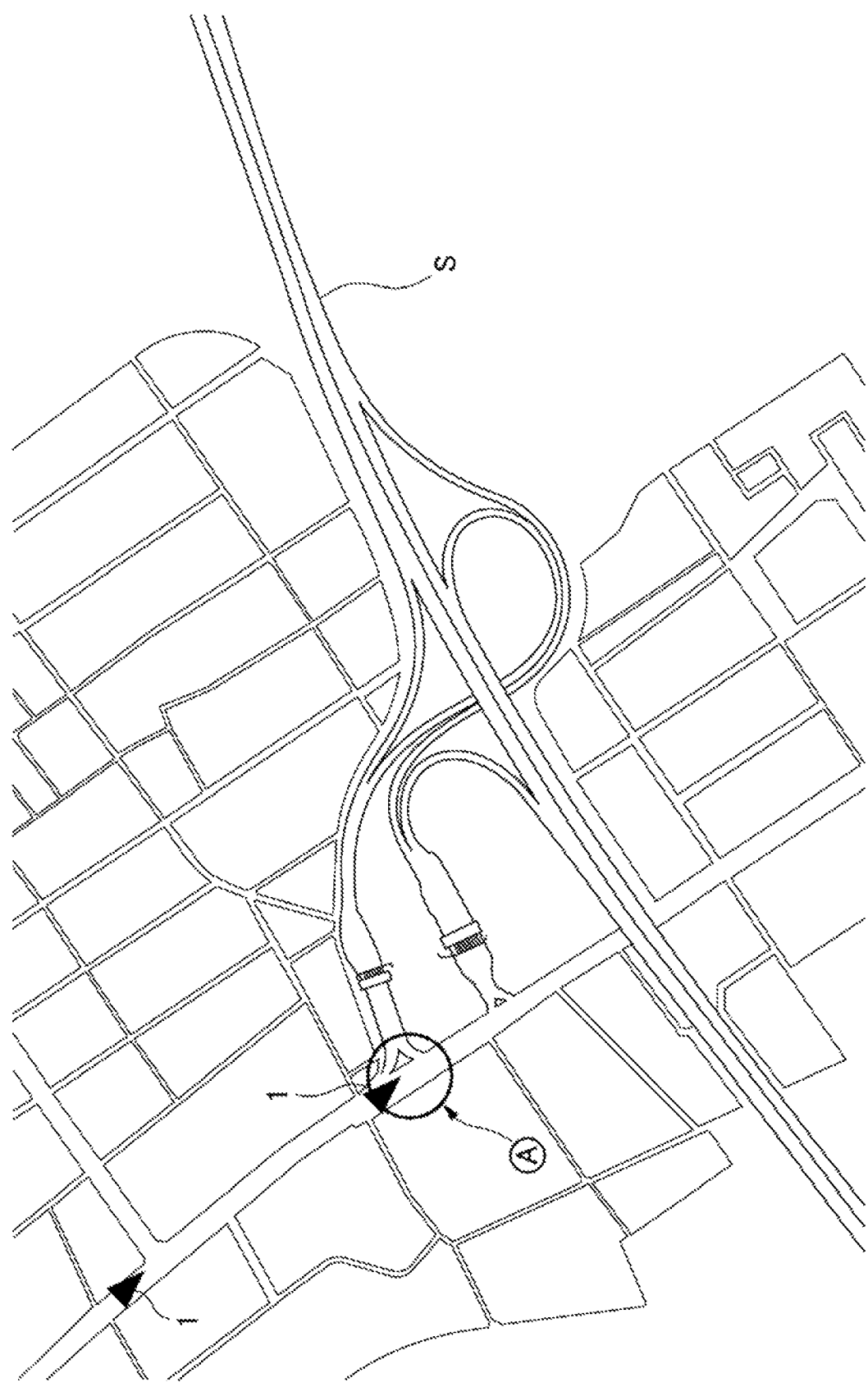
FIG. 15 is a schematic view showing a position of a host vehicle.

The automatic driving available signal will be described with reference to FIG. 15. FIG. 15 is a schematic view showing the position of the host vehicle 1. In the third embodiment, it is assumed that the highway S is an automatic driving available range. As shown in FIG. 15, a transmission device that emits a wireless signal notifying that the vehicle is allowed to travel in the automatic driving mode on the highway S is installed at an entrance of the highway S. In FIG. 15, an area in which strength of the wireless signal emitted from the transmission device is equal to or larger than a predetermined value is indicated by a reference sign A. When the host vehicle 1 enters the area A, the wireless communication unit 10 acquires a wireless signal emitted from the transmission device, and outputs the automatic driving available signal to the vehicle control unit 3. When the host vehicle is located outside the area A, the automatic driving available signal is not input to the vehicle control unit 3.

The cleaner control unit 2116 includes an automatic mode execution unit 2117 and an operation prohibition unit 2118. The automatic mode execution unit 2117 and the operation prohibition unit 2118 are realized by an electronic control unit of the cleaner control unit 2116.

The automatic mode executing unit 2117 executes a cleaner automatic mode for automatically causing the cleaner unit 110 to operate based on a predetermined condition. The predetermined condition refers to, for example, a case of entering an automatic driving available range such as an expressway (for example, a highway), a case of switching to the automatic driving mode after entering the automatic driving available range, or when the cleaner automatic button 21 is pressed by the user, or the like. The case of switching to the automatic driving mode after entering the automatic driving available range refers to, for example, a case of automatically switching to the automatic driving mode by performing a predetermined process (for example, a dirt conformation process, a pre-cleaning process, or the like), or a case where the automatic driving button 22 is pressed by the user who confirms entry into the automatic driving available range.

The operation prohibition unit 2118 prohibits the operation of the cleaner unit 110 based on the vehicle speed and the obstacle information. Prohibiting the operation of the cleaner unit 110 includes a case of stopping the operation of the cleaner unit while the cleaner unit is in operation or a case of releasing the cleaner automatic mode. The obstacle includes, for example, something that may interfere with traveling of the host vehicle such as a fallen object or a deposit on a road, an accident vehicle, a preceding vehicle traveling at a low speed or stopped due to traffic congestion, traffic regulation, or the like. The obstacle information refers to information related to these obstacles, and is, for example, position information of the obstacles and road traffic information (for example, traffic congestion or traffic regulation)

acquired by the external sensor 6 (camera, radar, LiDAR, or the like) or the wireless communication unit 10 as described above.

When acquiring the obstacle information existing within the predetermined distance ahead of the host vehicle from the vehicle control unit 3, the operation prohibition unit 2118 acquires, from the vehicle control unit 3, information of the braking distance corresponding to the vehicle speed acquired by the vehicle speed sensor 5 and the maximum detection distance of the external sensor 6, and prohibits the operation of the cleaner unit 110 when the braking distance is equal to or larger than the maximum detection distance of the external sensor 6.

Figure 16A:
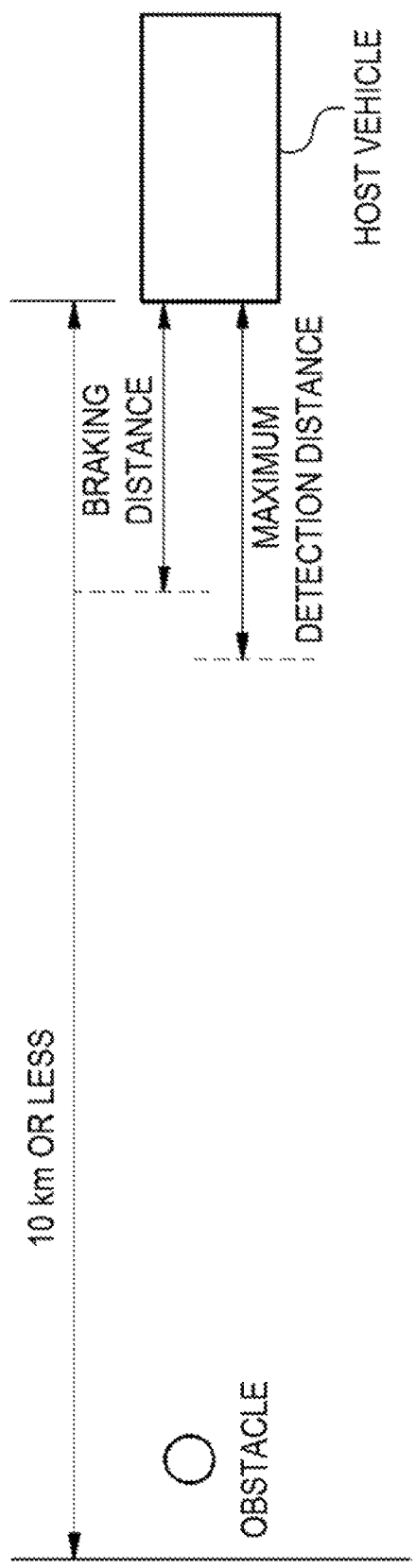
FIG. 16A is a view showing an operation of an operation prohibition unit.
Figure 16B:
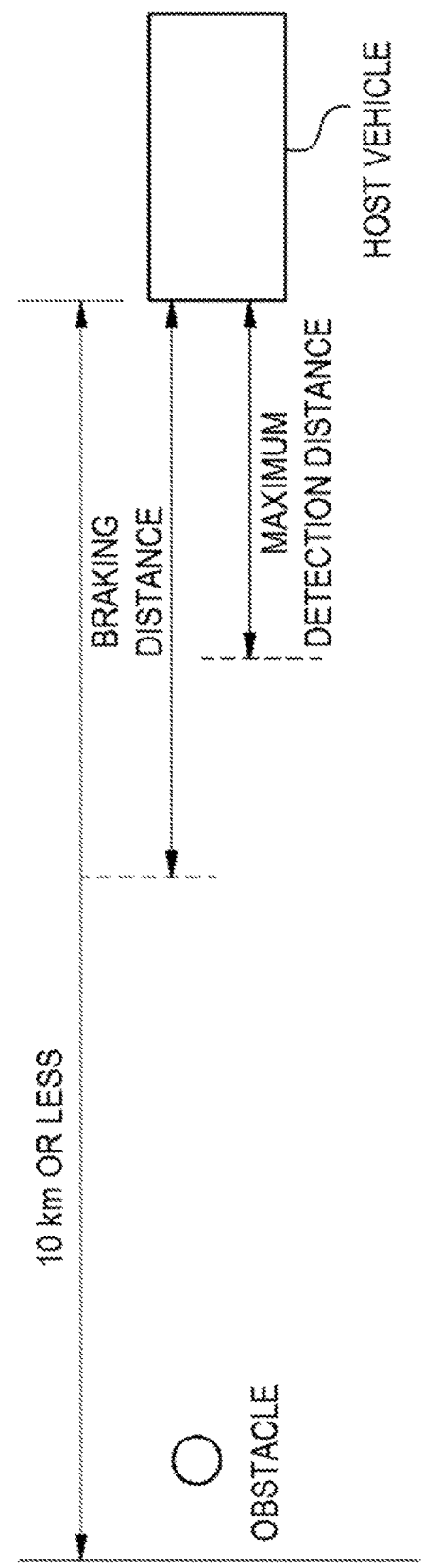
FIG. 16B is a view showing the operation of the operation prohibition unit.

FIGS. 16A and 16B shows an example in which an obstacle exists within 10 km ahead of the host vehicle. In general, the vehicle speed and the braking distance are in a proportional relation. That is, as shown in FIG. 16A, when the vehicle speed is low, the braking distance decreases, and the maximum detection distance of the external sensor is larger than the braking distance of the host vehicle. That is, as shown in FIG. 16B, when the vehicle speed is high, the braking distance increases, and the maximum detection distance of the external sensor is smaller than the braking distance of the host vehicle. That is, in the case of FIG. 16B, when the vehicle speed is large, the braking distance increases, and it becomes difficult for the vehicle to avoid the obstacle after the obstacle is detected by the external sensor 6. Therefore, it is preferable that the external sensor 6 continues sensing continuously without lowering the sensitivity by the operation of the cleaner. Therefore, in the third embodiment, by prohibiting the operation of the cleaner of the external sensor 6 in the case of FIG. 16B, it is possible to prevent a decrease in the sensitivity of the external camera 6 and to continue sensing.

The automatic mode execution unit 2117 may drive at least one of the cleaner units 110, or may operate all the cleaner units 110. In the first place, since the sensitivity of the external sensor 6 that acquires the external information in front is required when the automatic driving mode is executed, it is preferable to operate at least the front camera cleaner 109a for cleaning the front camera 6c that acquires the information on the front side of the vehicle and the front LC 103 for cleaning the front LiDAR 6f.

The operation prohibition unit 2118 may prohibit the operation of only the cleaner units 110 corresponding to the external sensors 6 whose maximum detection distance is smaller than the braking distance, or may prohibit the operation of all the cleaner units 110.

Figure 17:
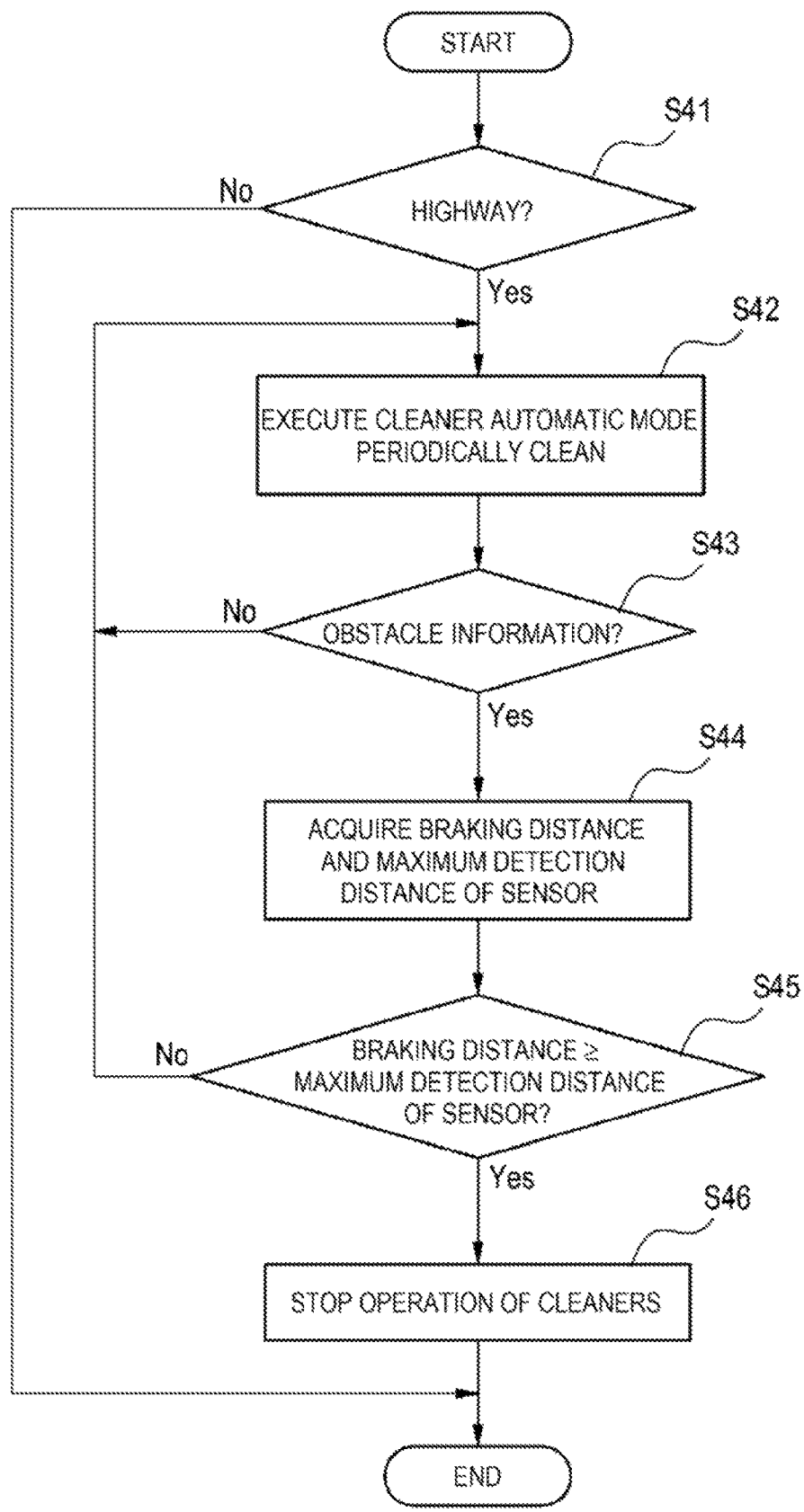
FIG. 17 is a flowchart executed by a cleaner control unit of a vehicle cleaner system according to a third embodiment.

Next, the operation of the vehicle cleaner system 2100 according to the third embodiment will be described. FIG. 17 is a flowchart executed by the cleaner control unit 2116.

As shown in FIG. 17, first, the cleaner control unit 2116 determines whether the host vehicle 1 enters the highway (step S41). For example, the cleaner control unit 2116 determines whether an automatic driving available signal is acquired from the wireless communication unit 10 of the external sensor 6.

When the host vehicle 1 is located outside the area A of FIG. 15 and the cleaner control unit 2116 does not acquire the automatic driving available signal (step S41: No), the cleaner control unit 2116 ends the process.

When the host vehicle 1 is located in the area A and the cleaner control unit 2116 acquires the automatic driving available signal (step S41: Yes), the automatic mode execution unit 2117 of the cleaner control unit 2116 executes the cleaner automatic mode (step S42). For example, the automatic mode executing unit 2117 periodically drives the cleaner unit 110 to clean the external sensor 6. The automatic mode execution unit 2117 may drive the cleaner unit 110 each time a predetermined time elapses or each time a predetermined distance is traveled. In step S42, the cleaner control unit 2116 may drive at least one of the cleaner units 110, or may operate all the cleaner units 110.

Next, the cleaner control unit 2116 determines whether obstacle information existing within a predetermined distance (for example, 10 km) ahead of the host vehicle from the wireless communication unit 10 or the like is acquired (step S43).

When the cleaner control unit 2116 determines in step S43 that the obstacle information is not acquired (step S43: No), the cleaner control unit 2116 returns to step S42 and continues the cleaner automatic mode.

When the cleaner control unit 2116 determines in step S43 that the obstacle information has been acquired (step S43: Yes), the cleaner control unit 2116 acquires the vehicle speed information of the host vehicle 1 from the vehicle speed sensor 5, and acquires the braking distance information corresponding to the vehicle speed of the host vehicle 1 and the maximum detection distance information of the external sensor 6 from the vehicle control unit 3 (Step S44).

Next, the cleaner control unit 2116 compares the braking distance and the maximum detection distance of the external sensor 6, and when it is determined that the braking distance is equal to or larger than the maximum detection distance of the external sensor 6 (step S45: Yes), the cleaner control unit 2116 stops the operation of the cleaner unit 110 in operation (step S46).

When the cleaner control unit 2116 determines in step S45 that the braking distance is smaller than the maximum detection distance of the external sensor (step S45: No), the cleaner control unit 2116 returns to step S42 and continues the cleaner automatic mode.

As described above, according to the vehicle cleaner system 2100 according to the third embodiment, the cleaner control unit 2116 executes the cleaner automatic mode when entering an automatic driving available range such as a highway. The cleaner control unit 2116 is configured to, when acquiring the obstacle information, stop the operation of the cleaner when the braking distance of the host vehicle 1 is equal to or larger than the maximum detection distance of the external sensor 6. Therefore, when the obstacle information is received while traveling on the road, the cleaner unit 110 of the external sensor 6 can be prevented from operating, which prevent lowering of the sensitivity of the external sensor 6 and avoids contact with the obstacle.

The third embodiment described above describes an example configured to stop the operation of the cleaner while the cleaner is in operation with a case where the host vehicle 1 enters a highway as the predetermined condition for executing the cleaner automatic mode, but the present invention is not limited thereto.

Fourth Embodiment

Hereinafter, a vehicle cleaner system according to a fourth embodiment will be described with reference to the drawings. Incidentally, members having the same reference numbers as members that have been described in the description of the first and the third embodiments will be omitted for convenience of description.

Figure 18:
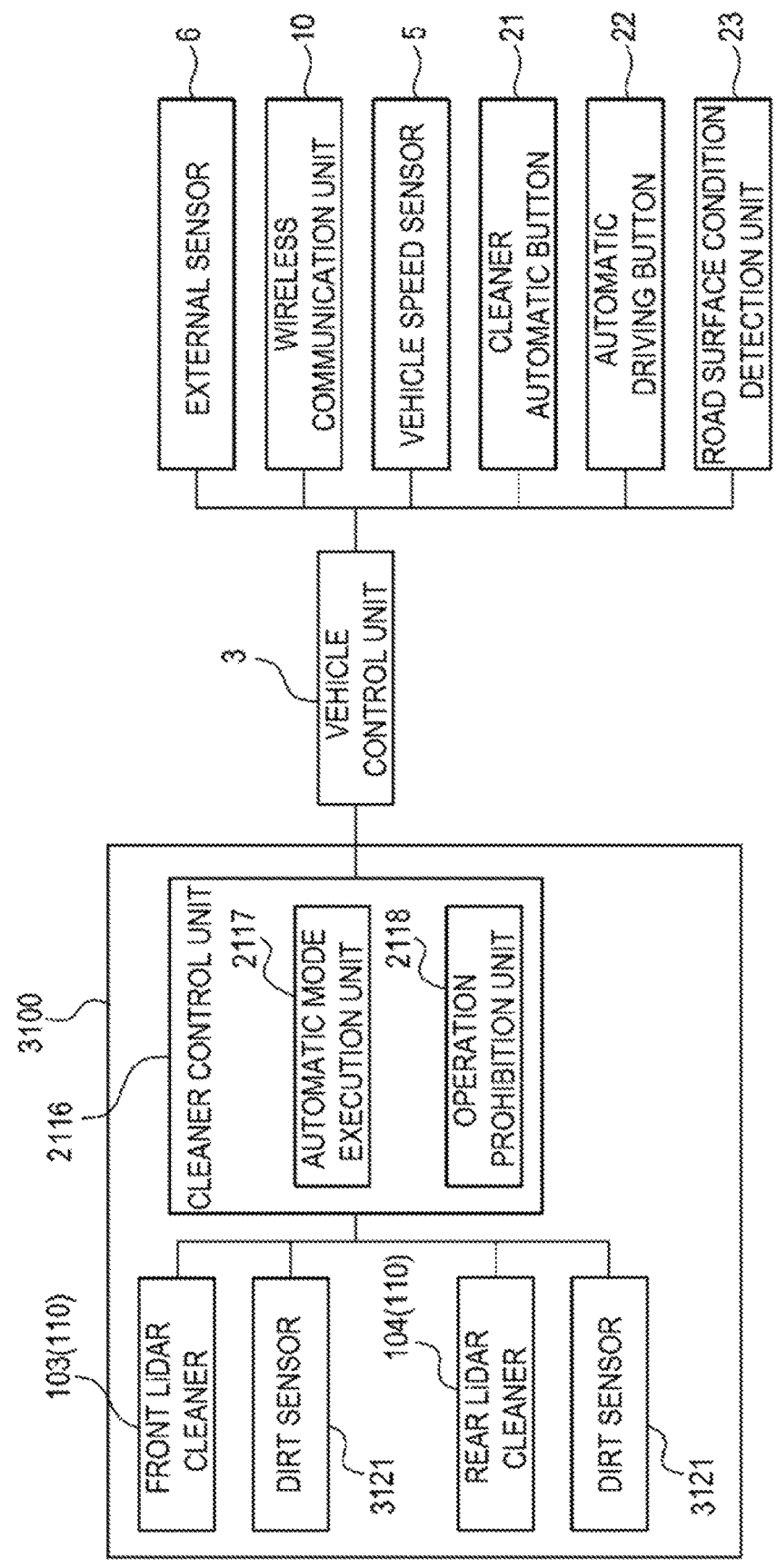
FIG. 18 is a block diagram of a main part of a vehicle cleaner system according to a fourth embodiment.

FIG. 18 is a block diagram of a main part of a vehicle cleaner system 3100 according to the fourth embodiment. In the fourth embodiment, detailed description of the same elements and the same steps as those of the third embodiment will be omitted.

As shown in FIG. 18, the vehicle cleaner system 3100 includes the cleaner units 110 that clean the external sensors 6, the cleaner control unit 2116 that controls the operations of the cleaner units 110, the external sensors 6, and dirt sensors 3121 capable of detecting whether the external sensors 6 are clean. Although only the dirt sensors for the front LC 103 and the rear LC 104 are shown as the dirt sensors 3121 in FIG. 18, it is needless to say that the vehicle cleaner system 3100 includes the other cleaner units 110 and the corresponding dirt sensors as shown in FIG. 3. The dirt sensors 3121 may be included in the cleaner units 110.

The cleaner control unit 2116 is connected to the external sensor 6 (camera, radar, LiDAR, etc.), the wireless communication unit 10, the vehicle speed sensor 5, a cleaner automatic button 21, an automatic driving button 22, and a road surface condition detection unit 23 via the vehicle control unit 3. The road surface condition detection unit 23 is, for example, a weather sensor or the like that detects a weather condition, determines a road surface state from a weather condition, and outputs road surface condition information to the vehicle control unit 3. The road surface condition information output to the vehicle control unit 3 is output to the cleaner control unit 2116 as appropriate.

Figure 19:
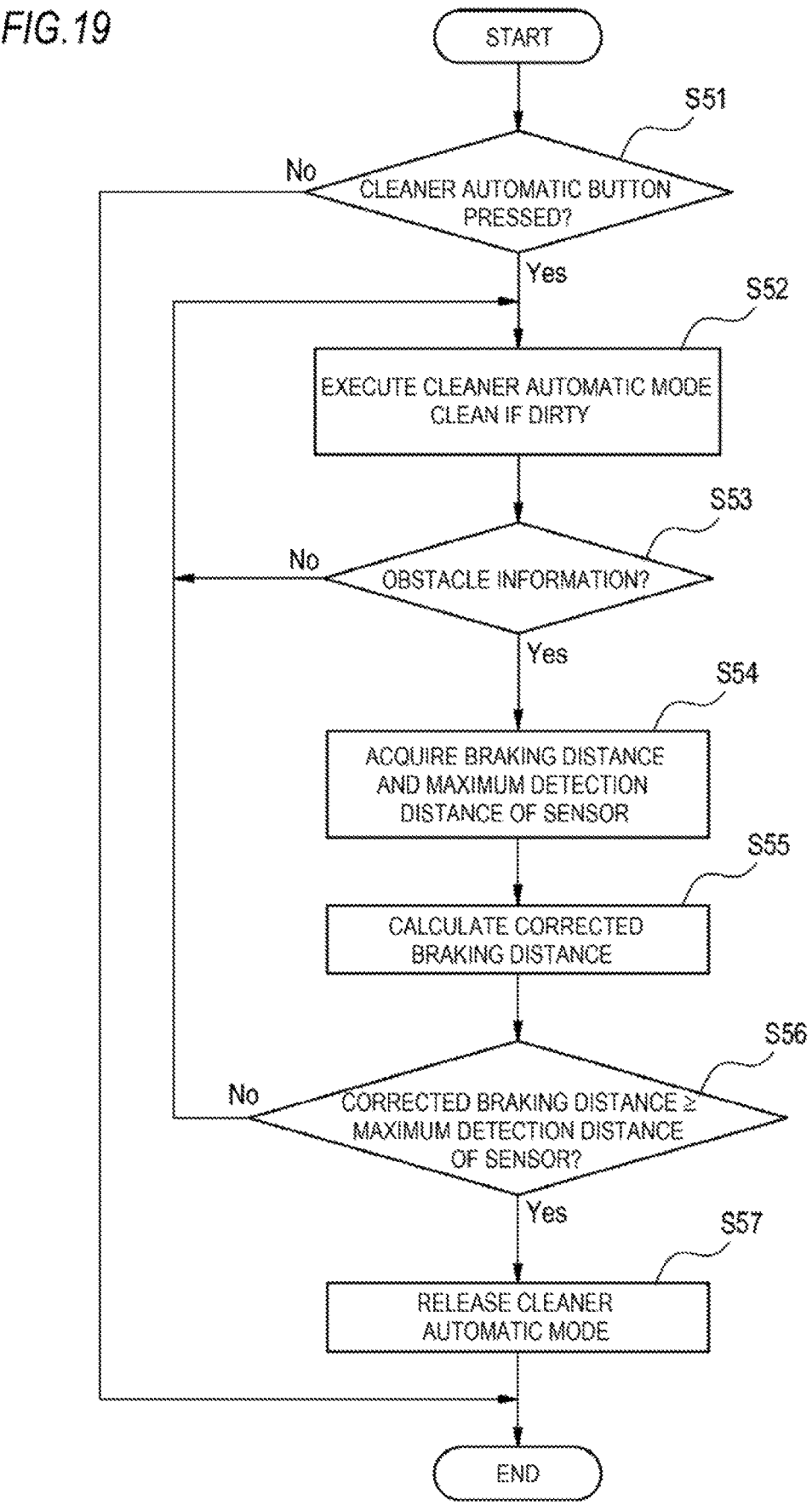
FIG. 19 is a flowchart executed by a cleaner control unit of the vehicle cleaner system according to the fourth embodiment.

FIG. 19 illustrates the operation of the vehicle cleaner system 3100 according to the fourth embodiment. FIG. 19 is a flowchart executed by the cleaner control unit 2116.

As shown in FIG. 19, first, the cleaner control unit 2116 determines whether the cleaner automatic button 21 is pressed by the user (step S51). For example, the cleaner control unit 2116 determines whether a cleaner automatic signal is acquired from the cleaner automatic button 21.

When the cleaner control unit 2116 does not acquire the cleaner automatic signal (step S51: No), the cleaner control unit 2116 ends the process.

When the cleaner control unit 2116 acquires the cleaner automatic signal (step S51: Yes), the automatic mode execution unit 2117 of the cleaner control unit 2116 executes the cleaner automatic mode (step S52). For example, when it is determined that the external sensor 6 is not clean based on the output of the dirt sensor 3121, the automatic mode execution unit 2117 drives the cleaner unit 110 to clean the external sensor 6.

Incidentally, the determination as to whether the external sensor 6 needs to be cleaned in step S52 may be performed on all the external sensors 6 or may be determined only for a specific external sensor 6. In a case where it is determined that the specific external sensor 6 needs to be cleaned, all the external sensors 6 may be cleaned.

Next, the cleaner control unit 2116 determines whether obstacle information existing within a predetermined distance (for example, 10 km) ahead of the host vehicle from the wireless communication unit 10 or the like is acquired (step S53).

When the cleaner control unit 2116 determines in step S53 that the obstacle information is not acquired (step S53: No), the cleaner control unit 2116 returns to step S52 and continues the cleaner automatic mode.

When the cleaner control unit 2116 determines in step S53 that the obstacle information has been acquired (step S53: Yes), the cleaner control unit 2116 acquires the vehicle speed information of the host vehicle 1 from the vehicle speed sensor 5, and acquires the braking distance information corresponding to the vehicle speed of the host vehicle 1 and the maximum detection distance information of the external sensor 6 from the vehicle control unit 3 (Step S54).

Next, the cleaner control unit 2116 receives the road surface condition information from the road surface condition detection unit 23 and calculates a corrected braking distance by multiplying the braking distance by a coefficient according to the condition of the road surface (step S55). The coefficient corresponding to the condition of the road surface is stored in advance in the vehicle control unit 3 or the cleaner control unit 2116. For example, the coefficient is set to 1 at the time of sunny weather, while the value of the coefficient is increased in order to increase the braking distance in a slippery situation.

When the cleaner control unit 2116 determines in step S56 that the corrected braking distance is equal to or larger than the maximum detection distance of the external sensor (step S56: Yes), the cleaner control unit 2116 releases the cleaner automatic mode (step S57).

When the cleaner control unit 2116 determines in step S56 that the corrected braking distance is smaller than the maximum detection distance of the external sensor (step S56: No), the cleaner control unit 2116 returns to step S52 and continues the cleaner automatic mode.

As described above, according to the vehicle cleaner system 3100 according to the fourth embodiment, the cleaner control unit 2116 executes the cleaner automatic mode when the cleaner automatic button 21 is pressed. The cleaner control unit 2116 is configured to, when acquiring the obstacle information, release the cleaner automatic mode when the corrected braking distance calculated by multiplying the braking distance of the host vehicle 1 by the coefficient according to the road surface condition is equal to or larger than the maximum detection distance of the external sensor 6. Therefore, when the obstacle information is received while traveling on the road, the cleaner unit 110 of the external sensor 6 can be prevented from operating, which prevent lowering of the sensitivity of the external sensor 6 and avoids contact with the obstacle.

In the fourth embodiment, the cleaner control unit 2116 is configured to determine whether the external sensor 6 needs to be cleaned based on the output of the dirt sensor 3121, but the present invention is not limited thereto. The cleaner control unit 2116 may be configured to determine whether the external sensor 6 needs to be cleaned based on weather information.

<Various Modification> Although the embodiments of the present invention have been described above, it is needless to say that the technical scope of the present invention should not be interpreted as being limited to the description of the embodiments. It is to be understood by those skilled in the art that the embodiment is merely an example and various modifications can be made within the scope of the invention described in the claims. The technical scope of the present invention should be determined based on the scope of the invention described in claims and an equivalent scope thereof.

In the present embodiment, the driving mode of the vehicle is described as including the driving modes of levels 0 to 5, but the driving mode of the vehicle should not be limited to these modes. The driving mode of the vehicle may include at least one of these modes. For example, only any one of the driving modes of the vehicle may be executable.

A classification and a display form of the driving mode of the vehicle may be appropriately changed according to laws or regulations related to automated driving in each country. Similarly, definitions of the driving modes in the description of the present embodiments are merely examples and may be appropriately changed according to the laws or regulations related to the automated driving in each country.

Although the above embodiment describes an example in which the cleaner system 100, 1100, 2100, 3100 is mounted on a vehicle capable of automatic driving, the cleaner system 100, 1100, 2100, 3100 may be mounted on a vehicle not capable of automatic driving.

In the present embodiment, although the configuration in which the above-described cleaner system 100, 1100, 2100, 3100 includes the external sensor 6 has been described, the cleaner system 100, 1100, 2100, 3100 may be configured not to include the external sensor 6. However, it is preferable that the cleaner system 100, 1100, 2100, 3100 is configured as an assembly including the external sensor 6 because positioning accuracy of the cleaners 103 to 106, 109a and 109b with respect to the external sensor 6 can be easily increased. In addition, since the external sensors 6 can also be incorporated together when the cleaner system 100, 1100, 2100, 3100 is mounted on the vehicle 1, the ease of assembly to the vehicle 1 is also enhanced.

In the present embodiment, as a cleaner for cleaning the external sensor 6, the cleaners 103 to 106 for cleaning the LiDARs 6f, 6b, 6r, and 61, the cleaner 109a for cleaning the front camera 6c, and the cleaner 109b for cleaning the rear camera 6d have been described, but the present invention is not limited thereto. The cleaner system 100, 1100, 2100, 3100 may include a cleaner for cleaning a radar, or the like, instead of the sensor cleaners 103 to 106, 109a, and 109b, or may include the cleaner with the sensor cleaners 103 to 106, 109a, and 109b.

Note that the external sensor 6 such as the LiDARs 6f, 6b, 6r, and 61 may have a detection surface and a cover that covers the detection surface. The cleaner for cleaning the external sensor 6 may be configured to clean the detection surface, or may be configured to clean the cover that covers the sensor.

The cleaning liquid discharged by the cleaner system 100, 1100, 2100, 3100 includes water or a detergent. The cleaning mediums to be discharged to the front and rear windows 1f, 1b, the headlamps 7r, 7l, the LiDARs 6f, 6b, 6r, 6l, and the cameras 6c, 6d may be different or may be the same.

In the embodiment described above, although an example in which the cleaners 101, 103, 105 to 109a are connected to the front tank 111 and the cleaners 102, 104, 109b are connected to the rear tank 113 has been described, the present invention is not limited thereto.

The cleaners 101 to 109b may be connected to one tank. The cleaners 101 to 109b may also be connected to different tanks.

Alternatively, the cleaners 101 to 109b may be connected to a common tank for each type of an object to be cleaned thereof. For example, the LCs 103 to 106 may be connected to a common first tank, and the HCs 107, 108 may be connected to a second tank different from the first tank.

Alternatively, the cleaners 101 to 109b may be connected to a common tank for each arrangement position of the object to be cleaned thereof. For example, the front WW 101, the front LC 103, and the front camera cleaner 109a may be connected to a common front tank, the right LC 105 and the right HC 107 may be connected to a common right tank, the rear WW 102, the rear WWI 04, and the rear camera cleaner 109b may be connected to a common rear tank, and the left LC 106 and the left HC 108 may be connected to a common left tank.

Although an example in which the cleaning medium is discharged from the cleaners 101 to 109b by operating the actuators provided in the cleaners 101 to 109b has been described in the present embodiment, the present invention is not limited thereto.

Each of the cleaners 101 to 109b is provided with a normally closed valve, the pump is operated such that a pressure between the tank and each of the cleaners 101 to 109b is always high. The cleaner control unit 116, 1116, 2116 may open the valves provided in the cleaners 101 to 109b to discharge the cleaning mediums from the cleaners 101 to 109b.

Alternatively, each of the cleaners 101 to 109b is connected to an individual pump, and the cleaner control unit 116, 1116, 2116 may control each pump individually to control the discharge of the cleaning mediums from the cleaners 101 to 109b. In this case, each of the cleaners 101 to 109b may be connected to different tanks, or may be connected to a common tank.

Each of the cleaners 101 to 109b is provided with one or more discharge holes for discharging the cleaning medium. Each of the cleaners 101 to 109b may be provided with one or more discharge holes for discharging the cleaning liquid and one or more discharge holes for discharging air.

Each of the cleaners 101 to 109b may be individually provided, or the plurality of the cleaners 101 to 109b may be formed as a unit. For example, the right LC 105 and the right HC 107 may be configured as a single unit. In contrast to an aspect in which the right headlamp 7r and the right LiDAR 6r are integrated, the right LC 105 and the right HC 107 may be configured as a single unit.

The third and fourth embodiments show examples in which the automatic mode execution unit 2117 and the operation prohibition unit 2118 are incorporated in the electronic control unit forming the cleaner control unit 2116, but the automatic mode execution unit 2117 and the operation prohibition unit 2118 may be incorporated in the electronic control unit constituting the vehicle control unit 3, and the cleaner control unit 2116 and the vehicle control unit 3 may be configured separately. In addition, a single electronic control unit may function as both the cleaner control unit 2116 and the vehicle control unit 3.

Further, the third and fourth embodiments describe examples in which the wireless communication unit 10 outputs the automatic driving available signal indicating entry into the automatic driving available range, but the present invention is not limited thereto. When a navigation system (not shown) that sets a scheduled course of the host vehicle includes a region where the vehicle is permitted to travel in the automatic driving mode in the scheduled course, the navigation system may output the automatic driving available signal to the cleaner control unit 2116 when the host vehicle reaches a point in front of the region by a predetermined length (for example, 1 km ahead).

Alternatively, the image recognition unit may output the automatic driving available signal to the cleaner control unit 2116 when the front camera 6c captures an image of a sign or the like indicating the area in which the vehicle is allowed to travel in the automatic driving mode and an image recognition unit (not shown) recognizes the sign.

The third and fourth embodiments describe an example in which the information of the braking distance and the maximum detection distance of the external sensor 6 is stored in the vehicle control unit 3 in advance, but the present invention is not limited thereto. The information of the braking distance and the maximum detection distance of the external sensor 6 may be stored in the cleaner control unit 2116.

In the third embodiment, the cleaning is periodically performed in the cleaner execution mode, but the cleaning may be performed in accordance with the dirt or the weather information as in the fourth embodiment. In the third embodiment, the braking distance and the maximum detection distance of the sensor are compared, but the corrected braking distance and the maximum detection distance of the sensor may be compared as in the fourth embodiment.

In the fourth embodiment, in the cleaner execution mode, the cleaning is performed when dirty, but the cleaning may be performed periodically as in the third embodiment. In the fourth embodiment, the corrected braking distance and the maximum detection distance of the sensor are compared, but the braking distance and the maximum detection distance of the sensor may be compared as in the third embodiment.

The third and fourth embodiments describe a configuration in which the operation of the cleaner is prohibited when the braking distance is equal to or longer than the maximum detection distance of the external sensor 6, but the present invention is not limited thereto. It may be preferable to prohibit the operation of the cleaner even when the braking distance is shorter than the maximum detection distance of the external sensor 6. For example, when an obstacle is at a position closer than the braking distance, it is not preferable to cause the cleaner to operate. That is, even in the cleaner automatic mode, when an obstacle is at a position closer than the braking distance, it is preferable to prohibit the operation of the cleaner.

The present application is based on Japanese Patent Application No. 2018-051329 filed on Mar. 19, 2018, Japanese Patent Application No. 2018-051339 filed on Mar. 19, 2018, Japanese Patent Application No. 2018-041034 filed on Mar. 7, 2018, and Japanese Patent Application No. 2018-041035 filed on Mar. 7, 2018, the contents of which are incorporated herein by reference.

The invention claimed is:

1. A vehicle cleaner system, comprising:
a cleaner configured to clean an external sensor that acquires information outside a vehicle; and
a cleaner control unit configured to control an operation of the cleaner,
wherein the cleaner control unit includes:
an automatic mode execution unit configured to execute an automatic mode for automatically causing the cleaner to operate based on a predetermined vehicle speed of a moving vehicle, and
an operation prohibition unit configured to prohibit operation of the cleaner based on vehicle speed and obstacle information,
wherein when the vehicle speed is below or equal to the predetermined vehicle speed, the cleaner operates in a first operation mode, and when the vehicle speed is greater than the predetermined vehicle speed, the cleaner operates in a second operation mode,
wherein when the vehicle operates in the first operation mode, the cleaner control unit is configured to operate the cleaner for at least twice the duration when compared to when the vehicle operates in the second operation mode.

2. The vehicle cleaner system according to claim 1, wherein the operation prohibition unit is configured to prohibit the automatic mode based on the vehicle speed and the obstacle information.

3. The vehicle cleaner system according to claim 1, wherein the operation prohibition unit is configured to stop the cleaner in operation based on the vehicle speed and the obstacle information.

4. The vehicle cleaner system according to claim 1, wherein the operation prohibition unit is configured to prohibit operation of the cleaner when a braking distance corresponding to the vehicle speed is equal to or larger than a maximum detection distance of the external sensor.

5. The vehicle cleaner system according to claim 1, further comprising:
the cleaner configured to be mounted on the vehicle and to discharge a cleaning liquid to the external sensor that acquires information outside the vehicle so as to clean the external sensor; and
the cleaner control unit configured to control the cleaner,
wherein the cleaner control unit is configured to acquire the vehicle speed, and
wherein the cleaner control unit is configured to control the cleaner such that at least one of a discharge amount of the cleaning liquid, a discharge amount of the cleaning liquid per unit time, the number of times of discharge of the cleaning liquid, a number of times of discharge of the cleaning liquid per unit time, and a discharge time of the cleaning liquid varies according to the vehicle speed.

6. The vehicle cleaner system according to claim 1, wherein the cleaner includes:
a liquid nozzle configured to discharge the cleaning liquid toward the external sensor, and
an air nozzle configured to discharge air toward the external sensor, and
wherein the cleaner control unit is configured to control the cleaner such that at least one of a discharge amount of the air, a discharge amount of the air per unit time, a number of times of discharge of the air, the number of times of discharge of the air per unit time, and a discharge time of the air varies according to the vehicle speed.

7. The vehicle cleaner system according to claim 1, wherein the cleaner comprises a plurality of cleaners, where each of the plurality of cleaners is provided corresponding to each of a plurality of external sensors mounted at different positions of the vehicle,
wherein the cleaner control unit is configured to determine whether the operation prohibition unit is prohibiting the operation of each of the plurality of cleaners from respectively cleaning each of the plurality of external sensors, and
wherein the cleaner control unit is configured to determine whether each of the plurality of external sensors is required to be cleaned to operate.

8. The vehicle system according to claim 1, further comprising:
a vehicle control unit;
the cleaner configured to be mounted on the vehicle and to discharge a cleaning liquid to the external sensor that acquires information outside the vehicle so as to clean the external sensor; and
the cleaner control unit configured to control the cleaner,
wherein the cleaner control unit is configured to acquire the vehicle speed, and
wherein the cleaner control unit is configured to control the cleaner such that at least one of a discharge amount of the cleaning liquid, a discharge amount of the cleaning liquid per unit time, the number of times of discharge of the cleaning liquid, a number of times of discharge of the cleaning liquid per unit time, and a discharge time of the cleaning liquid varies according to the vehicle speed.

9. The vehicle cleaner system according to claim 1,
wherein the cleaner comprises a first cleaner and a second cleaner,
wherein the first cleaner is configured to be mounted on the vehicle and to discharge a cleaning liquid to a first sensor that acquires information of a first region around the vehicle so as to clean the first sensor;
wherein the second cleaner is configured to be mounted on the vehicle and to discharge a cleaning liquid to a second sensor that acquires information of a second region around the vehicle that is different from the first region so as to clean the second sensor; and
wherein the cleaner control unit is configured to control the first cleaner and the second cleaner,
wherein the cleaner control unit is configured to acquire the vehicle speed, and
wherein the cleaner control unit is configured to permit operation of the first cleaner and prohibit operation of the second cleaner when the vehicle speed is equal to or larger than a predetermined value.

10. The vehicle cleaner system according to claim 9,
wherein the first region is a front region of the vehicle, and the second region is a rear region of the vehicle.

11. The vehicle system according to claim 1, comprising:
a vehicle control unit;
wherein the cleaner comprises a first cleaner and a second cleaner,
wherein the first cleaner is configured to be mounted on the vehicle and to discharge a cleaning liquid to a first sensor that acquires information of a first region around the vehicle so as to clean the first sensor;
wherein the second cleaner is configured to be mounted on the vehicle and to discharge a cleaning liquid to a second sensor that acquires information of a second region around the vehicle that is different from the first region so as to clean the second sensor;
and wherein the cleaner control unit is configured to control the first cleaner and the second cleaner,
wherein the cleaner control unit is configured to acquire the vehicle speed, and
wherein the cleaner control unit is configured to permit operation of the first cleaner and prohibit operation of the second cleaner when the vehicle speed is equal to or larger than a predetermined value.

12. The vehicle cleaner system according to claim 1, further comprising:
the cleaner configured to be mounted on the vehicle and to discharge a cleaning liquid to the external sensor that acquires information outside the vehicle so as to clean the external sensor;
and the cleaner control unit configured to control the cleaner,
wherein the cleaner control unit is configured to acquire the vehicle speed, and
wherein the cleaner control unit is configured to permit operation of the cleaner when the vehicle speed is equal to or smaller than a predetermined value, and prohibit operation of the cleaner when the vehicle speed is larger than the predetermined value.

13. The vehicle cleaner system according to claim 12,
wherein the cleaner control unit is configured to further acquire position information related to a current position of the vehicle and traffic congestion information, and
wherein the cleaner control unit is configured to determine whether the cleaner unit is operable when the vehicle satisfies a predetermined condition based on the position information and the traffic congestion information.

14. The vehicle cleaner system according to claim 13,
wherein the predetermined condition includes a case in which the vehicle is determined as located within a predetermined range from a traffic congestion location.

15. The vehicle cleaner system according to claim 14,
wherein the cleaner control unit is configured to permit operation of the cleaner unit when the vehicle is determined as reaching an end of the traffic congestion location.

* * * * *